(12) United States Patent
Yin et al.

(10) Patent No.: US 10,708,100 B2
(45) Date of Patent: Jul. 7, 2020

(54) SYSTEMS AND METHODS FOR FREQUENCY-DIVISION DUPLEX TRANSMISSION TIME INTERVAL OPERATION

(71) Applicants: Sharp Kabushiki Kaisha, Sakai-ku, Sakai, Osaka (JP); FG Innovation Company Limited, New Territories, Hong Kong (CN)

(72) Inventors: Zhanping Yin, Vancouver, WA (US); Toshizo Nogami, Vancouver, WA (US)

(73) Assignees: Sharp Kabushiki Kaisha, Osaka (JP); FG Innovation Company Limited, Hong Kong (CN)

( * ) Notice: Subject to any disclaimer, the term of this patent is extended or adjusted under 35 U.S.C. 154(b) by 36 days.

(21) Appl. No.: 15/591,945

(22) Filed: May 10, 2017

(65) Prior Publication Data

US 2017/0338988 A1 Nov. 23, 2017

Related U.S. Application Data

(60) Provisional application No. 62/339,036, filed on May 19, 2016.

(51) Int. Cl.
*H04L 27/26* (2006.01)
*H04L 1/18* (2006.01)
(Continued)

(52) U.S. Cl.
CPC ........ *H04L 27/2613* (2013.01); *H04L 1/1812* (2013.01); *H04L 1/1854* (2013.01);
(Continued)

(58) Field of Classification Search
CPC ............. H04W 72/042; H04W 72/044; H04W 72/0446; H04W 72/1268; H04W 74/006;
(Continued)

(56) References Cited

U.S. PATENT DOCUMENTS 8,780,937 B2 7/2014 Classon et al.
8,787,347 B2 7/2014 Gorokhov et al.
(Continued)

FOREIGN PATENT DOCUMENTS

WO 2014068279 A1 5/2014
WO 2016040290 A1 3/2016
WO WO-2016040290 A1 * 3/2016 ........... H04L 1/0007

OTHER PUBLICATIONS

Ericsson, Qualcomm, "Way forward on processing timing reduction for sTTI", 3GPP TSG RAN WG1 Meeting #84bis, Seoul, Korea, R1-163721, Apr. 15, 2016.
(Continued)

*Primary Examiner* — Michael Thier
*Assistant Examiner* — Prince A Mensah
(74) *Attorney, Agent, or Firm* — Austin Rapp

(57) ABSTRACT

A user equipment (UE) is described. The UE is configured to determine a duplex method of a serving cell. The UE is also configured to determine that shortened transmission time interval (sTTI) is configured on at least one of one or more downlink subframes or one or more uplink subframes. The UE is further configured to determine a sTTI downlink size and a sTTi uplink size. The UE is additionally configured to determine an association timing reference sTTI size based on the sTTI downlink size and the sTTI uplink size. The UE is also configured to determine a sTTI PDSCH HARQ-ACK transmission timing for the serving cell. The UE is further configured to determine a sTTI PUSCH scheduling timing for the serving cell. The UE is additionally configured to determine a sTTI PUSCH HARQ-ACK transmission timing for the serving cell.

4 Claims, 19 Drawing Sheets

(51) Int. Cl.
*H04L 5/00* (2006.01)
*H04L 5/14* (2006.01)
*H04W 72/12* (2009.01)

(52) U.S. Cl.
CPC .......... *H04L 1/1864* (2013.01); *H04L 5/0055* (2013.01); *H04L 5/0082* (2013.01); *H04L 5/0092* (2013.01); *H04L 5/14* (2013.01); *H04L 5/1423* (2013.01); *H04L 5/1438* (2013.01); *H04W 72/1205* (2013.01)

(58) Field of Classification Search
CPC ............. H04W 72/1205; H04L 1/1812; H04L 1/1854; H04L 1/1864; H04L 5/0055; H04L 5/0082; H04L 5/0092; H04L 5/14; H04L 5/1423; H04L 5/1438; H04L 27/2613
See application file for complete search history.

(56) References Cited

U.S. PATENT DOCUMENTS

| | | | | |
|---|---|---|---|---|
| 2017/0332365 | A1* | 11/2017 | Lin | H04W 72/0406 |
| 2017/0332397 | A1* | 11/2017 | Li | H04L 1/1861 |
| 2018/0076942 | A1* | 3/2018 | Nory | H04L 1/1854 |
| 2018/0205534 | A1* | 7/2018 | Yi | H04L 5/1469 |
| 2018/0323939 | A1* | 11/2018 | Nory | H04L 5/0055 |
| 2019/0029012 | A1* | 1/2019 | Wu | H04W 72/04 |

OTHER PUBLICATIONS

Huawei, HiSilicon, "Discussion on DL HARQ timing for short TTI", 3GPP TSG RAN WG1 Meeting #84bis, Busan, Korea, R1-162111, Apr. 15, 2016.
ZTE, "Processing time reduction and related procedures", 3GPP TSG RAN WG1 Meeting #84bis, Busan, Korea, R1-162408, Apr. 15, 2016.
NEC, "Discussion on TTI shortening for DL/UL transmissions", 3GPP TSG RAN WG1 Meeting #84bis, Busan, Korea, R1-162446, Apr. 15, 2016.
LG Electronics, "Physical layer aspect of processing time for shortened TTI", 3GPP TSG RAN WG1 Meeting #84bis, Busan, Korea, R1-162511, Apr. 15, 2016.
Panasonic, "Discussion on processing time reduction in physical layer", 3GPP TSG RAN WG1 Meeting #84bis, Busan, Korea, R1-162534, Apr. 15, 2016.
Huawei, HiSilicon, "Processing time reduction for short TTI", 3GPP TSG RAN WG1 Meeting #84bis, Busan, Korea, R1-162617, Apr. 15, 2016.
Samsung, "Study on eNB and UE processing time for TTI shortening", 3GPP TSG RAN WG1 Meeting #84bis, Busan, Korea, R1-162708, Apr. 15, 2016.
Nokia, Alcatel-Lucent Shanghai Bell, "Processing time considerations for supporting latency reduction", 3GPP TSG RAN WG1 Meeting #84bis, Busan, Korea, R1-162789, Apr. 15, 2016.
Nokia, Alcatel-Lucent Shanghai Bell, "On UL HARQ for Supporting Latency Reduction", 3GPP TSG RAN WG1 Meeting #84bis, Busan, Korea, R1-162790, Apr. 15, 2016.
CMCC, "Discussion on HARQ timing design for reduced TTI", 3GPP TSG RAN WG1 Meeting #84bis, Busan, Korea, R1-162866, Apr. 15, 2016.
Qualcomm Incorporated, "Processing time reduction and related procedures for DL", 3GPP TSG RAN WG1 Meeting #84bis, Busan, Korea, R1-163070, Apr. 15, 2016.
Qualcomm Incorporated, "Processing time reduction and related procedures for UL", 3GPP TSG RAN WG1 Meeting #84bis, Busan, Korea, R1-163071, Apr. 15, 2016.
NTT DOCOMO, Inc., "Discussions on TTI shortening", 3GPP TSG RAN WG1 Meeting #84bis, Busan, Korea, R1-163175, Apr. 15, 2016.
ASUSTeK, "Discussion on HARQ Process for Slot-based TTI", 3GPP TSG RAN WG1 Meeting #84bis, Busan, Korea, R1-163284, Apr. 15, 2016.
Ericsson, "On processing time reduction and related procedures", 3GPP TSG RAN WG1 Meeting #84bis, Busan, Korea, R1-163326, Apr. 15, 2016.
International Search Report and Written Opinion issued for PCT Application No. PCT/US2017/032735 dated Aug. 3, 2017.
Nokia Networks, Alcatel-Lucent, Alcatel-Lucent Shanghai Bell, "Considerations of FDD DL HARQ for Supporting Latency Reduction", 3GPP TSG-RAN WG1 Meeting #84, St. Julian's, Malta, R1-160798, Feb. 19, 2016.

\* cited by examiner

SYSTEMS AND METHODS FOR FREQUENCY-DIVISION DUPLEX TRANSMISSION TIME INTERVAL OPERATION

RELATED APPLICATIONS

This application is related to and claims priority from U.S. Provisional Patent Application No. 62/339,036, entitled "SYSTEMS AND METHODS FOR FREQUENCY-DIVISION DUPLEX TRANSMISSION TIME INTERVAL OPERATION," filed on May 19, 2016, which is hereby incorporated by reference herein, in its entirety.

TECHNICAL FIELD

The present disclosure relates generally to communication systems. More specifically, the present disclosure relates to user equipments (UEs), base stations and methods.

BACKGROUND

Wireless communication devices have become smaller and more powerful in order to meet consumer needs and to improve portability and convenience. Consumers have become dependent upon wireless communication devices and have come to expect reliable service, expanded areas of coverage and increased functionality. A wireless communication system may provide communication for a number of wireless communication devices, each of which may be serviced by a base station. A base station may be a device that communicates with wireless communication devices.

As wireless communication devices have advanced, improvements in communication capacity, speed, flexibility and/or efficiency have been sought. However, improving communication capacity, speed, flexibility and/or efficiency may present certain problems.

For example, wireless communication devices may communicate with one or more devices using a communication structure. However, the communication structure used may only offer limited flexibility and/or efficiency. As illustrated by this discussion, systems and methods that improve communication flexibility and/or efficiency may be beneficial.

DETAILED DESCRIPTION

Figure 1:
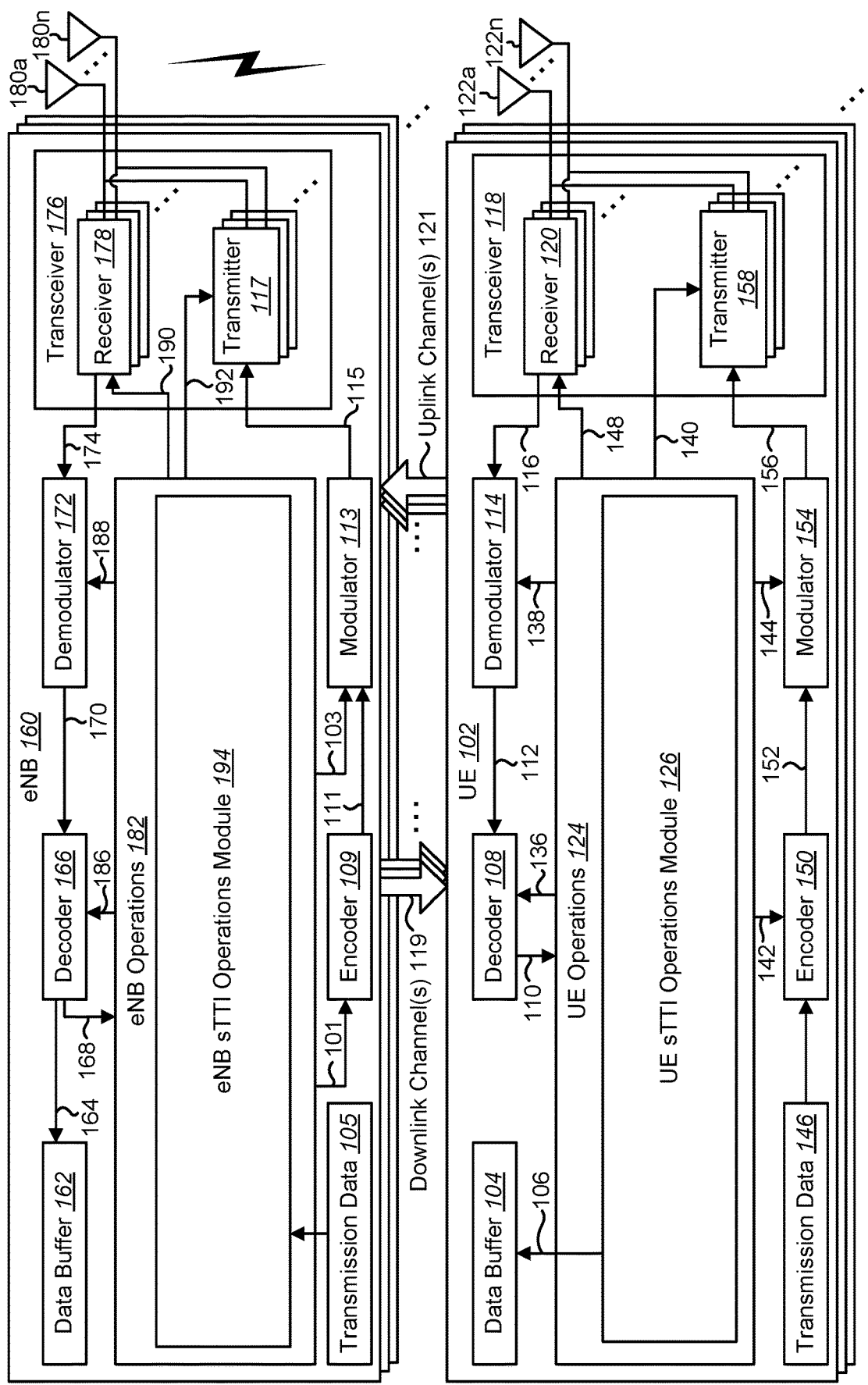
FIG. 1 is a block diagram illustrating an example of one or more evolved Node Bs (eNBs) and one or more user equipments (UEs) in which systems and methods for frequency-division duplex (FDD) transmission time interval (TTI) operation may be implemented.

A user equipment (UE) is described. The UE includes a processor and memory in electronic communication with the processor. Instructions stored in the memory are executable to determine a duplex method of a serving cell. The instructions are also executable to determine that shortened transmission time interval (sTTI) is configured on at least one of one or more downlink subframes or one or more uplink subframes. The instructions are further executable to determine a sTTI downlink size and a sTTi uplink size. The instructions are additionally executable to determine an association timing reference sTTI size based on the sTTI downlink size and the sTTI uplink size. The instructions are also executable to determine a sTTI physical downlink shared channel (PDSCH) Hybrid Automatic Repeat Request Acknowledgement/Negative Acknowledgement (HARQ-ACK) transmission timing for the serving cell. The instructions are further executable to determine a sTTI physical uplink shared channel (PUSCH) scheduling timing for the serving cell. The instructions are additionally executable to determine a sTTI PUSCH HARQ-ACK transmission timing for the serving cell.

The sTTI on at least one of one or more downlink subframes or one or more uplink subframes may have one or more sTTI formats. The one or more sTTI formats may include slot-based, 1 orthogonal frequency-division multiplexing (OFDM) symbol, 2 OFDM symbols, 3 and 4 OFDM symbols, and 7 OFDM symbols.

If the downlink sTTI size is smaller than uplink sTTI size, the association timing reference sTTI size may be based on the uplink sTTI size. HARQ-ACK of multiple downlink shortened PDSCHs (sPDSCHs) that end within an uplink sTTI n−4 may be reported in an uplink sTTI n.

A shortened PUSCH (sPUSCH) in an uplink sTTI n+4 may be scheduled by a last downlink sTTI that ends within an uplink sTTI n. An sPUSCH in an uplink sTTI n+4 may be scheduled by a first downlink sTTI that ends within an uplink sTTI n. An sPUSCH in an uplink sTTI n+4 is scheduled by a first downlink sTTI that starts within an uplink sTTI n. An sPUSCH in an uplink sTTI n+4 may be scheduled by any downlink sTTI that ends within an uplink sTTI n.

HARQ-ACK feedback of an sPUSCH transmission in an uplink sTTI i–4 may be on a first downlink sTTI that ends within an uplink sTTI i. HARQ-ACK feedback of an sPUSCH transmission in an uplink sTTI i–4 may be on a first downlink sTTI that starts within an uplink sTTI i. HARQ-ACK feedback of an sPUSCH transmission in an uplink sTTI i–4 is on a same downlink sTTI position within an uplink sTTI i as an sPUSCH scheduling downlink sTTI.

If the downlink sTTI size is larger than the uplink sTTI size, the association timing reference sTTI size may be based on the downlink sTTI size. HARQ-ACK of downlink sPDSCHs in a downlink sTTI n–4 may be reported in a first uplink sTTI that starts within a range of a downlink sTTI n. HARQ-ACK of downlink sPDSCHs in a downlink sTTI n–4 may be reported in a first uplink sTTI that ends within a range of a downlink sTTI n. HARQ-ACK of downlink sPDSCHs in a downlink sTTI n–4 may be reported in a last uplink sTTI that ends within a range of a downlink sTTI n. HARQ-ACK of downlink sPDSCHs in a downlink sTTI n–4 may be reported in an indicated uplink sTTI that ends within a range of a downlink sTTI n.

An sPUSCH within a range of a downlink sTTI n+4 may be scheduled by downlink control information (DCI) or a shortened physical hybrid automatic repeat request (ARQ) indicator channel (sPHICH) in a downlink sTTI n with an indicated sPUSCH location.

HARQ-ACK feedback of an sPUSCH transmission within a downlink sTTI i–4 may be indicated by a separate shortened sPHICH resource in a downlink sTTI i.

If the downlink sTTI size is only configured smaller than the uplink sTTI size, the association timing reference sTTI size is always based on the uplink sTTI size.

The downlink sTTI size may be configured smaller than the uplink sTTI size or larger than the uplink sTTI size.

The association timing reference sTTI size may be reduced from 4 sTTI to 3 sTTI based on a longest size between the downlink sTTI size and the uplink sTTI size.

An evolved Node B (eNB) is also described. The eNB includes a processor and memory in electronic communication with the processor. Instructions stored in the memory are executable to determine a duplex method of a serving cell. The instructions are also executable to determine that sTTI is configured on at least one of one or more downlink subframes or one or more uplink subframes. The instructions are further executable to determine a sTTI downlink size and a sTTi uplink size. The instructions are additionally executable to determine an association timing reference sTTI size based on the sTTI downlink size and the sTTI uplink size. The instructions are also executable to determine a sTTI PDSCH HARQ-ACK transmission timing for the serving cell. The instructions are further executable to determine a sTTI PUSCH scheduling timing for the serving cell. The instructions are additionally executable to determine a sTTI PUSCH HARQ-ACK transmission timing for the serving cell.

The 3rd Generation Partnership Project, also referred to as "3GPP," is a collaboration agreement that aims to define globally applicable technical specifications and technical reports for third and fourth generation wireless communication systems. The 3GPP may define specifications for next generation mobile networks, systems and devices.

3GPP Long Term Evolution (LTE) is the name given to a project to improve the Universal Mobile Telecommunications System (UMTS) mobile phone or device standard to cope with future requirements. In one aspect, UMTS has been modified to provide support and specification for the Evolved Universal Terrestrial Radio Access (E-UTRA) and Evolved Universal Terrestrial Radio Access Network (E-UTRAN).

At least some aspects of the systems and methods disclosed herein may be described in relation to the 3GPP LTE, LTE-Advanced (LTE-A) and other standards (e.g., 3GPP Releases 8, 9, 10, 11 and/or 12). However, the scope of the present disclosure should not be limited in this regard. At least some aspects of the systems and methods disclosed herein may be utilized in other types of wireless communication systems.

A wireless communication device may be an electronic device used to communicate voice and/or data to a base station, which in turn may communicate with a network of devices (e.g., public switched telephone network (PSTN), the Internet, etc.). In describing systems and methods herein, a wireless communication device may alternatively be referred to as a mobile station, a user equipment (UE), an access terminal, a subscriber station, a mobile terminal, a remote station, a user terminal, a terminal, a subscriber unit, a mobile device, etc. Examples of wireless communication devices include cellular phones, smart phones, tablet devices, personal digital assistants (PDAs), laptop computers, netbooks, e-readers, wireless modems, etc. In 3GPP specifications, a wireless communication device is typically referred to as a UE. However, as the scope of the present disclosure should not be limited to the 3GPP standards, the terms "UE" and "wireless communication device" may be used interchangeably herein to mean the more general term "wireless communication device." A UE may also be more generally referred to as a terminal device.

In 3GPP specifications, a base station is typically referred to as a Node B, an evolved Node B (eNB), a home enhanced or evolved Node B (HeNB) or some other similar terminology. As the scope of the disclosure should not be limited to 3GPP standards, the terms "base station," "Node B," "eNB," and "HeNB" may be used interchangeably herein to mean the more general term "base station." Furthermore, the term "base station" may be used to denote an access point. An access point may be an electronic device that provides access to a network (e.g., Local Area Network (LAN), the Internet, etc.) for wireless communication devices. The term "communication device" may be used to denote both a wireless communication device and/or a base station. An eNB may also be more generally referred to as a base station device.

It should be noted that as used herein, a "cell" may refer to any set of communication channels over which the protocols for communication between a UE and eNB that may be specified by standardization or governed by regulatory bodies to be used for International Mobile Telecommunications-Advanced (IMT-Advanced) or its extensions and all of it or a subset of it may be adopted by 3GPP as licensed bands (e.g., frequency bands) to be used for communication between an eNB and a UE. "Configured cells" are those cells of which the UE is aware and is allowed by an eNB to transmit or receive information. "Configured cell(s)" may be serving cell(s). The UE may receive system information and perform the required measurements on all configured cells. "Activated cells" are those configured cells on which the UE is transmitting and receiving. That is, activated cells are those cells for which the UE monitors the physical downlink control channel (PDCCH) and in the case of a downlink transmission, those cells for which the UE decodes a physical downlink shared channel (PDSCH). "Deactivated cells" are those configured cells that the UE is not monitoring the transmission PDCCH. It should be noted that a "cell" may be described in terms of differing dimensions. For example, a "cell" may have temporal, spatial (e.g., geographical) and frequency characteristics.

It should be noted that the term "concurrent" and variations thereof as used herein may denote that two or more events may overlap each other in time and/or may occur near in time to each other. Additionally, "concurrent" and variations thereof may or may not mean that two or more events occur at precisely the same time.

The systems and methods discussed herein may relate to frequency-division duplex (FDD) transmission time interval (TTI) operation. For example, the systems and methods discussed herein may relate to FDD shortened TTI (sTTI) operation with latency reduction.

In latency reduction, different shortened transmit time interval (sTTI) lengths may be utilized. The reduced sTTI lengths may lead to reduced processing time and thus reduced round trip delay (e.g., round trip time (RTT)). Different scenarios of processing time reduction and RTT reduction with different sTTI sizes (particularly when the DL and UL have different TTI sizes, for example) are described herein. The reduced processing time may have impacts on association timing of: downlink (DL) Hybrid Automatic Hybrid Automatic Repeat Request Acknowledgement/Negative Acknowledgement (HARQ-ACK) reporting on an uplink (UL) subframe, UL physical uplink shared channel (PUSCH) scheduling from a DL subframe and/or UL HARQ-ACK feedback on a DL subframe for PUSCH transmission. The aforementioned issues have not been addressed. For example, most simulations assume that the same sTTI size is used on both UL and DL.

Semi-statically configured sTTI sizes on DL and UL are described in accordance with the systems and methods described herein. In some configurations, it may be assumed that a UE is not expected to receive sTTIs with different sizes within a legacy TTI. Additionally or alternatively, it may be assumed that a UE is not expected to transmit sTTIs with different sizes within a legacy TTI.

For sTTI sizes, the transmit time interval (TTI) lengths of UL and DL may be configured independently. Furthermore, the DL and UL channel may be configured independently (e.g., the shortened physical uplink control channel (sPUCCH) and shortened physical uplink shared channel (sPUSCH) may be configured with different sTTi sizes). For a frequency division duplex (FDD) cell, the processing delay may be scaled based on the configured TTI length. A DL TTI or sTTI may be associated with one or more UL TTI or sTTIs. A UL TTI or sTTI may be associated with one or more DL TTI or sTTIs.

Detailed association methods may be defined for sPDSCH HARQ-ACK reporting on a sTTI UL (e.g., sPUCCH or sPUSCH), shortened physical downlink shared channel (sPDSCH) retransmission based on HARQ-ACK feedback, sPUSCH scheduling by a sTTI DL and/or sPUSCH HARQ-ACK reporting on a sTTI DL. For all association timing and processing delays on a FDD cell, several methods may be considered.

In Approach 1, timing and/or delay may be scaled based on the larger TTI size between DL and UL. In Approach 2, timing and/or delay may be scaled between different TTI sizes, and adjusted to larger TTI size. Thus, latency may be further reduced compared with Approach 1.

In LTE release 12 and earlier, a transmission time interval (TTI) is a subframe with 1 millisecond (ms). For a reduced transmission time interval (R-TTI) for LTE, different TTI sizes are considered for both uplink (UL) and downlink (DL) TTI formats. A reduced TTI may also be referred as short TTI, shortened TTI (sTTI), etc.

Various examples of the systems and methods disclosed herein are now described with reference to the Figures, where like reference numbers may indicate functionally similar elements. The systems and methods as generally described and illustrated in the Figures herein could be arranged and designed in a wide variety of different implementations. Thus, the following more detailed description of several implementations, as represented in the Figures, is not intended to limit scope, as claimed, but is merely representative of the systems and methods.

FIG. 1 is a block diagram illustrating an example of one or more eNBs 160 and one or more UEs 102 in which systems and methods for frequency-division duplex (FDD) transmission time interval (TTI) operation may be implemented. The one or more UEs 102 communicate with one or more eNBs 160 using one or more antennas $122a$-$n$. For example, a UE 102 transmits electromagnetic signals to the eNB 160 and receives electromagnetic signals from the eNB 160 using the one or more antennas $122a$-$n$. The eNB 160 communicates with the UE 102 using one or more antennas $180a$-$n$.

The UE 102 and the eNB 160 may use one or more channels 119, 121 to communicate with each other. For example, a UE 102 may transmit information or data to the eNB 160 using one or more uplink channels 121. Examples of uplink channels 121 include a PUCCH and a PUSCH, etc. The one or more eNBs 160 may also transmit information or data to the one or more UEs 102 using one or more downlink channels 119, for instance. Examples of downlink channels 119 include a PDCCH, a PDSCH, etc. Other kinds of channels may be used.

Each of the one or more UEs 102 may include one or more transceivers 118, one or more demodulators 114, one or more decoders 108, one or more encoders 150, one or more modulators 154, a data buffer 104 and a UE operations module 124. For example, one or more reception and/or transmission paths may be implemented in the UE 102. For convenience, only a single transceiver 118, decoder 108, demodulator 114, encoder 150 and modulator 154 are illustrated in the UE 102, though multiple parallel elements (e.g., transceivers 118, decoders 108, demodulators 114, encoders 150 and modulators 154) may be implemented.

The transceiver 118 may include one or more receivers 120 and one or more transmitters 158. The one or more receivers 120 may receive signals from the eNB 160 using one or more antennas $122a$-$n$. For example, the receiver 120 may receive and downconvert signals to produce one or more received signals 116. The one or more received signals 116 may be provided to a demodulator 114. The one or more transmitters 158 may transmit signals to the eNB 160 using one or more antennas $122a$-$n$. For example, the one or more transmitters 158 may upconvert and transmit one or more modulated signals 156.

The demodulator 114 may demodulate the one or more received signals 116 to produce one or more demodulated signals 112. The one or more demodulated signals 112 may be provided to the decoder 108. The UE 102 may use the decoder 108 to decode signals. The decoder 108 may produce decoded signals 110, which may include a UE-decoded signal 106 (also referred to as a first UE-decoded signal 106). For example, the first UE-decoded signal 106 may comprise received payload data, which may be stored in a data buffer 104. Another signal included in the decoded signals 110 (also referred to as a second UE-decoded signal 110) may comprise overhead data and/or control data. For example, the second UE-decoded signal 110 may provide data that may be used by the UE operations module 124 to perform one or more operations.

As used herein, the term "module" may mean that a particular element or component may be implemented in hardware, software or a combination of hardware and software. However, it should be noted that any element denoted as a "module" herein may alternatively be implemented in hardware. For example, the UE operations module 124 may be implemented in hardware, software or a combination of both.

In general, the UE operations module 124 may enable the UE 102 to communicate with the one or more eNBs 160. The UE operations module 124 may include a UE shortened transmission time interval (sTTI) operations module 126. The UE sTTI operations module 126 may operate in accordance with one or more of the functions, methods, procedures, approaches, cases, examples and/or techniques described herein. For example, the UE sTTI operations module 126 may operate in accordance with the description given in connection with one or more of FIGS. 2-3 and 5-15.

The UE sTTI operations module 126 may determine a duplex method of a serving cell. For example, the UE sTTI operations module 126 may receive configuration information from the eNB 160 indicating whether the serving cell is a TDD cell or an FDD cell.

The UE sTTI operations module 126 may determine that a shortened transmission time interval (sTTI) is configured on one or more downlink subframes and/or uplink subframes. For example, the UE sTTI operations module 126 may receive configuration information from the eNB 160 indicating that sTTI is configured for one or mode downlink subframes and/or uplink subframes. Examples of sTTI formats may include slot-based, 1 orthogonal frequency-division multiplexing (OFDM) symbol, 2 OFDM symbols, 3 and 4 (3/4) OFDM symbols, and 7 OFDM symbols.

The UE sTTI operations module 126 may determine a sTTI downlink size and a sTTI uplink size. For example, the UE sTTI operations module 126 may receive configuration information from the eNB 160 that indicates the sTTI downlink size and the sTTI uplink size.

The UE sTTI operations module 126 may determine an association timing reference sTTI size based on the sTTI downlink size and the sTTI uplink size. For example, the UE sTTI operations module 126 may determine whether the sTTI downlink size or the sTTI uplink size is larger. The association timing reference sTTI size may be determined from the sTTI downlink size or the sTTI uplink size depending on which is larger.

The UE sTTI operations module 126 may determine a sTTI PDSCH HARQ-ACK transmission timing for the serving cell. For example, the HARQ-ACK of multiple downlink shortened PDSCHs (sPDSCHs) that end within an uplink sTTI n−4 may be reported in an uplink sTTI n. In another example, the HARQ-ACK of downlink shortened PDSCHs (sPDSCHs) in a downlink sTTI n−4 may be reported in a first uplink sTTI that starts within a range of a downlink sTTI n. In yet another example, the HARQ-ACK of downlink shortened PDSCHs (sPDSCHs) in a downlink sTTI n−4 may be reported in a first uplink sTTI that ends within a range of a downlink sTTI n. In yet another example, the HARQ-ACK of downlink shortened PDSCHs (sPDSCHs) in a downlink sTTI n−4 may be reported in a last uplink sTTI that ends within a range of a downlink sTTI n. In yet another example, the HARQ-ACK of downlink shortened PDSCHs (sPDSCHs) in a downlink sTTI n−4 is reported in an indicated uplink sTTI that ends within a range of a downlink sTTI n.

The UE sTTI operations module 126 may determine a sTTI PUSCH scheduling timing for the serving cell. For example, a shortened PUSCH (sPUSCH) in an uplink sTTI n+4 is scheduled by a last downlink sTTI that ends within an uplink sTTI n. In another example, a shortened PUSCH (sPUSCH) in an uplink sTTI n+4 is scheduled by a first downlink sTTI that ends within an uplink sTTI n. In yet another example, a shortened PUSCH (sPUSCH) in an uplink sTTI n+4 is scheduled by a first downlink sTTI that starts within an uplink sTTI n. In yet another example, a shortened PUSCH (sPUSCH) in an uplink sTTI n+4 is scheduled by any downlink sTTI that ends within an uplink sTTI n. In yet another example, a shortened PUSCH (sPUSCH) within a range of a downlink sTTI n+4 is scheduled by downlink control information (DCI) or a shortened physical hybrid automatic repeat request (ARQ) indicator channel (sPHICH) in a downlink sTTI n with an indicated sPUSCH location.

The UE sTTI operations module 126 may determine a sTTI PUSCH HARQ-ACK transmission timing for the serving cell. For example, the HARQ-ACK feedback of a shortened PUSCH (sPUSCH) transmission in an uplink sTTI i−4 is on a first downlink sTTI that ends within an uplink sTTI i. In another example, the HARQ-ACK feedback of a shortened PUSCH (sPUSCH) transmission in an uplink sTTI i−4 is on a first downlink sTTI that starts within an uplink sTTI i. In yet another example, the HARQ-ACK feedback of a shortened PUSCH (sPUSCH) transmission in an uplink sTTI i−4 is on a same downlink sTTI position within an uplink sTTI i as a sPUSCH scheduling downlink sTTI. In yet another example, the HARQ-ACK feedback of a shortened PUSCH (sPUSCH) transmission within a downlink sTTI i−4 is indicated by a separate shortened physical hybrid automatic repeat request (ARQ) indicator channel (sPHICH) resource in a downlink sTTI i.

The UE operations module 124 may provide information 148 to the one or more receivers 120. For example, the UE operations module 124 may inform the receiver(s) 120 when to receive retransmissions.

The UE operations module 124 may provide information 138 to the demodulator 114. For example, the UE operations module 124 may inform the demodulator 114 of a modulation pattern anticipated for transmissions from the eNB 160.

The UE operations module 124 may provide information 136 to the decoder 108. For example, the UE operations module 124 may inform the decoder 108 of an anticipated encoding for transmissions from the eNB 160.

The UE operations module 124 may provide information 142 to the encoder 150. The information 142 may include data to be encoded and/or instructions for encoding. For example, the UE operations module 124 may instruct the encoder 150 to encode transmission data 146 and/or other information 142. The other information 142 may include HARQ-ACK information.

The encoder 150 may encode transmission data 146 and/or other information 142 provided by the UE operations module 124. For example, encoding the data 146 and/or other information 142 may involve error detection and/or correction coding, mapping data to space, time and/or frequency resources for transmission, multiplexing, etc. The encoder 150 may provide encoded data 152 to the modulator 154.

The UE operations module 124 may provide information 144 to the modulator 154. For example, the UE operations module 124 may inform the modulator 154 of a modulation type (e.g., constellation mapping) to be used for transmissions to the eNB 160. The modulator 154 may modulate the encoded data 152 to provide one or more modulated signals 156 to the one or more transmitters 158.

The UE operations module 124 may provide information 140 to the one or more transmitters 158. This information 140 may include instructions for the one or more transmitters 158. For example, the UE operations module 124 may instruct the one or more transmitters 158 when to transmit a signal to the eNB 160. For instance, the one or more transmitters 158 may transmit during a UL subframe. The one or more transmitters 158 may upconvert and transmit the modulated signal(s) 156 to one or more eNBs 160.

The eNB 160 may include one or more transceivers 176, one or more demodulators 172, one or more decoders 166, one or more encoders 109, one or more modulators 113, a data buffer 162 and an eNB operations module 182. For example, one or more reception and/or transmission paths may be implemented in an eNB 160. For convenience, only a single transceiver 176, decoder 166, demodulator 172, encoder 109 and modulator 113 are illustrated in the eNB 160, though multiple parallel elements (e.g., transceivers 176, decoders 166, demodulators 172, encoders 109 and modulators 113) may be implemented.

The transceiver 176 may include one or more receivers 178 and one or more transmitters 117. The one or more receivers 178 may receive signals from the UE 102 using one or more antennas 180a-n. For example, the receiver 178 may receive and downconvert signals to produce one or more received signals 174. The one or more received signals 174 may be provided to a demodulator 172. The one or more transmitters 117 may transmit signals to the UE 102 using one or more antennas 180a-n. For example, the one or more transmitters 117 may upconvert and transmit one or more modulated signals 115.

The demodulator 172 may demodulate the one or more received signals 174 to produce one or more demodulated signals 170. The one or more demodulated signals 170 may be provided to the decoder 166. The eNB 160 may use the decoder 166 to decode signals. The decoder 166 may produce one or more decoded signals 164, 168. For example, a first eNB-decoded signal 164 may comprise received payload data, which may be stored in a data buffer 162. A second eNB-decoded signal 168 may comprise overhead data and/or control data. For example, the second eNB-decoded signal 168 may provide data (e.g., HARQ-ACK information) that may be used by the eNB operations module 182 to perform one or more operations.

In general, the eNB operations module 182 may enable the eNB 160 to communicate with the one or more UEs 102. The eNB operations module 182 may include one or more of an eNB sTTI operations module 194. The eNB sTTI operations module 194 may operate in accordance with one or more of the functions, methods, procedures, approaches, cases, examples and/or techniques described herein. For example, the eNB sTTI operations module 194 may operate in accordance with the description given in connection with one or more of FIGS. 2 and 4-15.

The eNB sTTI operations module 194 may determine a duplex method of a serving cell. For example, the eNB sTTI operations module 194 may send configuration information to a UE 102 indicating whether the serving cell is a TDD cell or an FDD cell.

The eNB sTTI operations module 194 may determine that a shortened transmission time interval (sTTI) is configured on one or more downlink subframes and/or uplink subframes. For example, the eNB sTTI operations module 194 may send configuration information to the UE 102 indicating that sTTI is configured for one or mode downlink subframes and/or uplink subframes. Examples of sTTI formats may include slot-based, 1 orthogonal frequency-division multiplexing (OFDM) symbol, 2 OFDM symbols, 3 and 4 (3/4) OFDM symbols, and 7 OFDM symbols.

The eNB sTTI operations module 194 may determine a sTTI downlink size and a sTTI uplink size. For example, the eNB sTTI operations module 194 may send configuration information to the UE 102 that indicates the sTTI downlink size and the sTTI uplink size.

The eNB sTTI operations module 194 may determine an association timing reference sTTI size based on the sTTI downlink size and the sTTI uplink size. For example, the eNB sTTI operations module 194 may determine whether the sTTI downlink size or the sTTI uplink size is larger. The association timing reference sTTI size may be determined from the sTTI downlink size or the sTTI uplink size depending on which is larger.

The eNB sTTI operations module 194 may determine a sTTI PDSCH HARQ-ACK transmission timing for the serving cell. For example, the HARQ-ACK of multiple downlink shortened PDSCHs (sPDSCHs) that end within an uplink sTTI n−4 may be reported in an uplink sTTI n. In another example, the HARQ-ACK of downlink shortened PDSCHs (sPDSCHs) in a downlink sTTI n−4 may be reported in a first uplink sTTI that starts within a range of a downlink sTTI n. In yet another example, the HARQ-ACK of downlink shortened PDSCHs (sPDSCHs) in a downlink sTTI n−4 may be reported in a first uplink sTTI that ends within a range of a downlink sTTI n. In yet another example, the HARQ-ACK of downlink shortened PDSCHs (sPDSCHs) in a downlink sTTI n−4 may be reported in a last uplink sTTI that ends within a range of a downlink sTTI n. In yet another example, the HARQ-ACK of downlink shortened PDSCHs (sPDSCHs) in a downlink sTTI n−4 is reported in an indicated uplink sTTI that ends within a range of a downlink sTTI n.

The eNB sTTI operations module 194 may determine a sTTI PUSCH scheduling timing for the serving cell. For example, a shortened PUSCH (sPUSCH) in an uplink sTTI n+4 is scheduled by a last downlink sTTI that ends within an uplink sTTI n. In another example, a shortened PUSCH (sPUSCH) in an uplink sTTI n+4 is scheduled by a first downlink sTTI that ends within an uplink sTTI n. In yet another example, a shortened PUSCH (sPUSCH) in an uplink sTTI n+4 is scheduled by a first downlink sTTI that starts within an uplink sTTI n. In yet another example, a shortened PUSCH (sPUSCH) in an uplink sTTI n+4 is scheduled by any downlink sTTI that ends within an uplink sTTI n. In yet another example, a shortened PUSCH (sPUSCH) within a range of a downlink sTTI n+4 is scheduled by downlink control information (DCI) or a shortened physical hybrid automatic repeat request (ARQ) indicator channel (sPHICH) in a downlink sTTI n with an indicated sPUSCH location.

The eNB sTTI operations module 194 may determine a sTTI PUSCH HARQ-ACK transmission timing for the serving cell. For example, the HARQ-ACK feedback of a shortened PUSCH (sPUSCH) transmission in an uplink sTTI i−4 is on a first downlink sTTI that ends within an uplink sTTI i. In another example, the HARQ-ACK feedback of a shortened PUSCH (sPUSCH) transmission in an uplink sTTI i–4 is on a first downlink sTTI that starts within an uplink sTTI i. In yet another example, the HARQ-ACK feedback of a shortened PUSCH (sPUSCH) transmission in an uplink sTTI i–4 is on a same downlink sTTI position within an uplink sTTI i as a sPUSCH scheduling downlink sTTI. In yet another example, the HARQ-ACK feedback of a shortened PUSCH (sPUSCH) transmission within a downlink sTTI i–4 is indicated by a separate shortened physical hybrid automatic repeat request (ARQ) indicator channel (sPHICH) resource in a downlink sTTI i.

The eNB operations module 182 may provide information 188 to the demodulator 172. For example, the eNB operations module 182 may inform the demodulator 172 of a modulation pattern anticipated for transmissions from the UE(s) 102.

The eNB operations module 182 may provide information 186 to the decoder 166. For example, the eNB operations module 182 may inform the decoder 166 of an anticipated encoding for transmissions from the UE(s) 102.

The eNB operations module 182 may provide information 101 to the encoder 109. The information 101 may include data to be encoded and/or instructions for encoding. For example, the eNB operations module 182 may instruct the encoder 109 to encode information 101, including transmission data 105.

The encoder 109 may encode transmission data 105 and/or other information included in the information 101 provided by the eNB operations module 182. For example, encoding the data 105 and/or other information included in the information 101 may involve error detection and/or correction coding, mapping data to space, time and/or frequency resources for transmission, multiplexing, etc. The encoder 109 may provide encoded data 111 to the modulator 113. The transmission data 105 may include network data to be relayed to the UE 102.

The eNB operations module 182 may provide information 103 to the modulator 113. This information 103 may include instructions for the modulator 113. For example, the eNB operations module 182 may inform the modulator 113 of a modulation type (e.g., constellation mapping) to be used for transmissions to the UE(s) 102. The modulator 113 may modulate the encoded data 111 to provide one or more modulated signals 115 to the one or more transmitters 117.

The eNB operations module 182 may provide information 192 to the one or more transmitters 117. This information 192 may include instructions for the one or more transmitters 117. For example, the eNB operations module 182 may instruct the one or more transmitters 117 when to (or when not to) transmit a signal to the UE(s) 102. The one or more transmitters 117 may upconvert and transmit the modulated signal(s) 115 to one or more UEs 102.

It should be noted that a DL subframe may be transmitted from the eNB 160 to one or more UEs 102 and that a UL subframe may be transmitted from one or more UEs 102 to the eNB 160. Furthermore, both the eNB 160 and the one or more UEs 102 may transmit data in a standard special subframe.

It should also be noted that one or more of the elements or parts thereof included in the eNB(s) 160 and UE(s) 102 may be implemented in hardware. For example, one or more of these elements or parts thereof may be implemented as a chip, circuitry or hardware components, etc. It should also be noted that one or more of the functions or methods described herein may be implemented in and/or performed using hardware. For example, one or more of the methods described herein may be implemented in and/or realized using a chipset, an application-specific integrated circuit (ASIC), a large-scale integrated circuit (LSI) or integrated circuit, etc.

Figure 2:
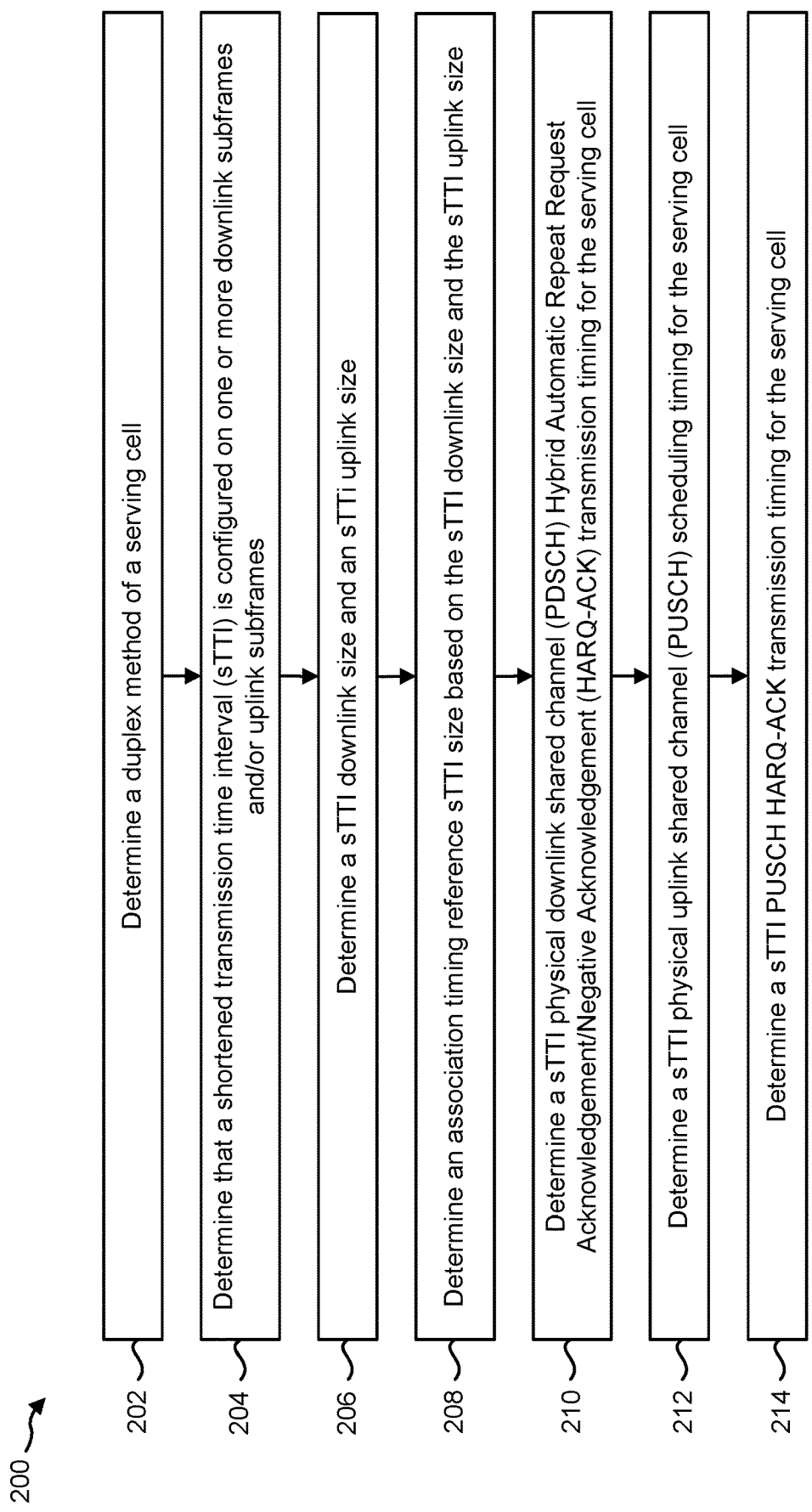
FIG. 2 is a flow diagram illustrating a method for frequency-division duplex (FDD) transmission time interval (TTI) operation.

FIG. 2 is a flow diagram illustrating a method 200 for frequency-division duplex (FDD) transmission time interval (TTI) operation. The method may be performed by a device (e.g., a UE 102 and/or an eNB 160). The device (e.g., a UE 102 and/or an eNB 160) may communicate with one or more other devices (e.g., an eNB 160 and/or a UE 102) in a wireless communication network. In some implementations, the wireless communication network may include an LTE network.

The device may determine 202 a duplex method of a serving cell. For example, the serving cell may be a TDD cell or an FDD cell.

The device may determine 204 that a shortened transmission time interval (sTTI) is configured on one or more downlink subframes and/or uplink subframes. For example, sTTI formats may include slot-based, 1 orthogonal frequency-division multiplexing (OFDM) symbol, 2 OFDM symbols, 3 and 4 (3/4) OFDM symbols, and 7 OFDM symbols.

The device may determine 206 a sTTI downlink size and a sTTI uplink size. For example, the device may receive configuration information from the eNB 160 that indicates the sTTI downlink size and the sTTI uplink size.

The device may determine 208 an association timing reference sTTI size based on the sTTI downlink size and the sTTI uplink size. For example, the device may determine 208 whether the sTTI downlink size or the sTTI uplink size is larger. The association timing reference sTTI size may be determined from the sTTI downlink size or the sTTI uplink size depending on which is larger.

The device may determine 210 a sTTI PDSCH HARQ-ACK transmission timing for the serving cell. For example, the HARQ-ACK of multiple downlink shortened PDSCHs (sPDSCHs) that end within an uplink sTTI n–4 may be reported in an uplink sTTI n. In another example, the HARQ-ACK of downlink shortened PDSCHs (sPDSCHs) in a downlink sTTI n–4 may be reported in a first uplink sTTI that starts within a range of a downlink sTTI n. In yet another example, the HARQ-ACK of downlink shortened PDSCHs (sPDSCHs) in a downlink sTTI n–4 may be reported in a first uplink sTTI that ends within a range of a downlink sTTI n. In yet another example, the HARQ-ACK of downlink shortened PDSCHs (sPDSCHs) in a downlink sTTI n–4 may be reported in a last uplink sTTI that ends within a range of a downlink sTTI n. In yet another example, the HARQ-ACK of downlink shortened PDSCHs (sPDSCHs) in a downlink sTTI n–4 is reported in an indicated uplink sTTI that ends within a range of a downlink sTTI n.

The device may determine 212 a sTTI PUSCH scheduling timing for the serving cell. For example, a shortened PUSCH (sPUSCH) in an uplink sTTI n+4 is scheduled by a last downlink sTTI that ends within an uplink sTTI n. In another example, a shortened PUSCH (sPUSCH) in an uplink sTTI n+4 is scheduled by a first downlink sTTI that ends within an uplink sTTI n. In yet another example, a shortened PUSCH (sPUSCH) in an uplink sTTI n+4 is scheduled by a first downlink sTTI that starts within an uplink sTTI n. In yet another example, a shortened PUSCH (sPUSCH) in an uplink sTTI n+4 is scheduled by any downlink sTTI that ends within an uplink sTTI n. In yet another example, a shortened PUSCH (sPUSCH) within a range of a downlink sTTI n+4 is scheduled by downlink control information (DCI) or a shortened physical hybrid automatic repeat request (ARQ) indicator channel (sPHICH) in a downlink sTTI n with an indicated sPUSCH location.

The device may determine 214 a sTTI PUSCH HARQ-ACK transmission timing for the serving cell. For example, the HARQ-ACK feedback of a shortened PUSCH (sPUSCH) transmission in an uplink sTTI i−4 is on a first downlink sTTI that ends within an uplink sTTI i. In another example, the HARQ-ACK feedback of a shortened PUSCH (sPUSCH) transmission in an uplink sTTI i−4 is on a first downlink sTTI that starts within an uplink sTTI i. In yet another example, the HARQ-ACK feedback of a shortened PUSCH (sPUSCH) transmission in an uplink sTTI i−4 is on a same downlink sTTI position within an uplink sTTI i as a sPUSCH scheduling downlink sTTI. In yet another example, the HARQ-ACK feedback of a shortened PUSCH (sPUSCH) transmission within a downlink sTTI i−4 is indicated by a separate shortened physical hybrid automatic repeat request (ARQ) indicator channel (sPHICH) resource in a downlink sTTI i.

Figure 3:
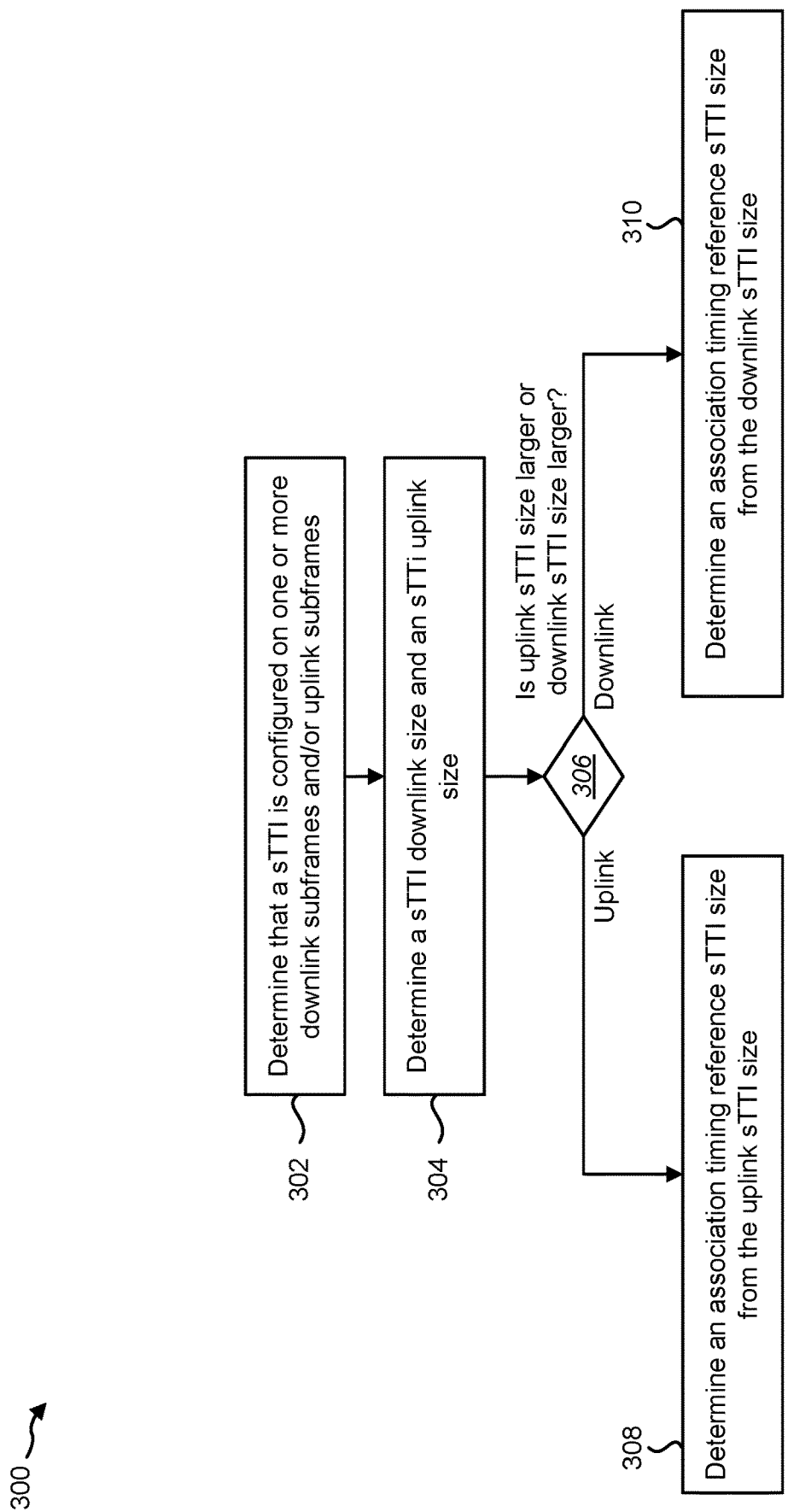
FIG. 3 is a flow diagram illustrating a method performed by a UE.

FIG. 3 is a flow diagram illustrating a method 300 performed by a UE 102. The UE 102 may communicate with an eNB 160 in a wireless communication network. In one implementation, the wireless communication network may include an LTE network.

The UE 102 may determine 302 that a sTTI is configured one or more downlink subframes and/or one or more uplink subframes. For example, the UE 102 may receive configuration signaling from the eNB 160 indicating that sTTI is configured for downlink subframe(s) and/or uplink subframe(s).

The UE 102 may determine 304 a sTTI downlink size and a sTTI uplink size. For example, the UE 102 may receive configuration information from the eNB 160 that indicates the sTTI downlink size and the sTTI uplink size.

The UE 102 may determine 306 whether the uplink sTTI size is larger or the downlink sTTI size is larger. For example, the UE 102 may compare the uplink sTTI size to the downlink sTTI size to determine 306 which is larger.

If the uplink sTTI size is larger, the UE 102 may determine 308 an association timing reference sTTI size from the uplink sTTI size. If the downlink sTTI size is larger, the UE 102 may determine 310 an association timing reference sTTI size from the downlink sTTI size. This may be accomplished as described herein.

Figure 4:
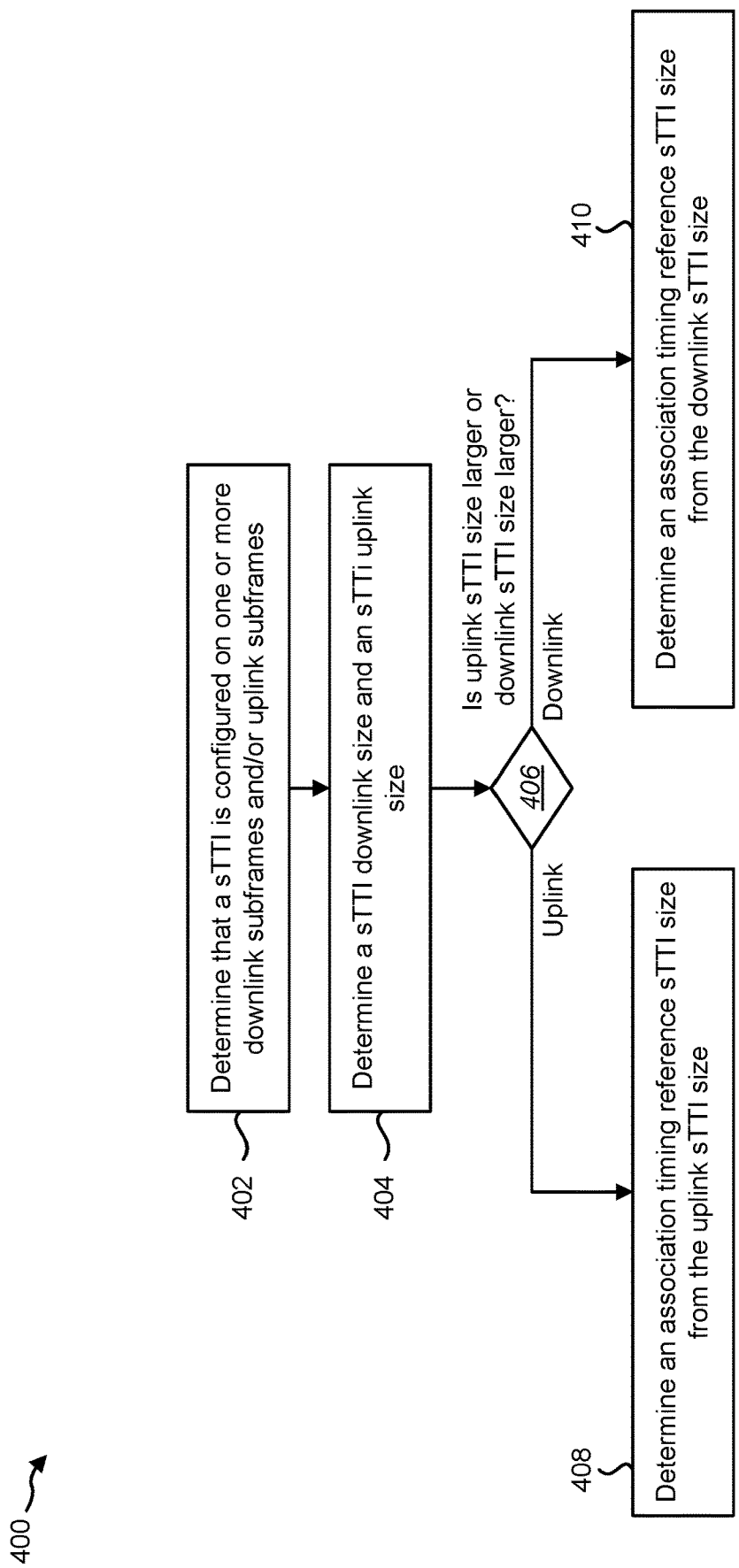
FIG. 4 is a flow diagram illustrating a method performed by an eNB.

FIG. 4 is a flow diagram illustrating a method 400 performed by an eNB 160. The eNB 160 may communicate with one or more UEs 102 in a wireless communication network. In one implementation, the wireless communication network may include an LTE network.

The eNB 160 may determine 402 that a sTTI is configured one or more downlink subframes and/or one or more uplink subframes. For example, the eNB 160 may configure sTTI for downlink subframe(s) and/or uplink subframe(s).

The eNB 160 may determine 404 a sTTI downlink size and a sTTI uplink size. For example, the eNB 160 may configure the sTTI downlink size and the sTTI uplink size.

The eNB 160 may determine 406 whether the uplink sTTI size is larger or the downlink sTTI size is larger. For example, the eNB 160 may compare the uplink sTTI size to the downlink sTTI size to determine 406 which is larger.

If the uplink sTTI size is larger, the eNB 160 may determine 408 an association timing reference sTTI size from the uplink sTTI size. If the downlink sTTI size is larger, the eNB 160 may determine 410 an association timing reference sTTI size from the downlink sTTI size. This may be accomplished as described herein.

Figure 5:
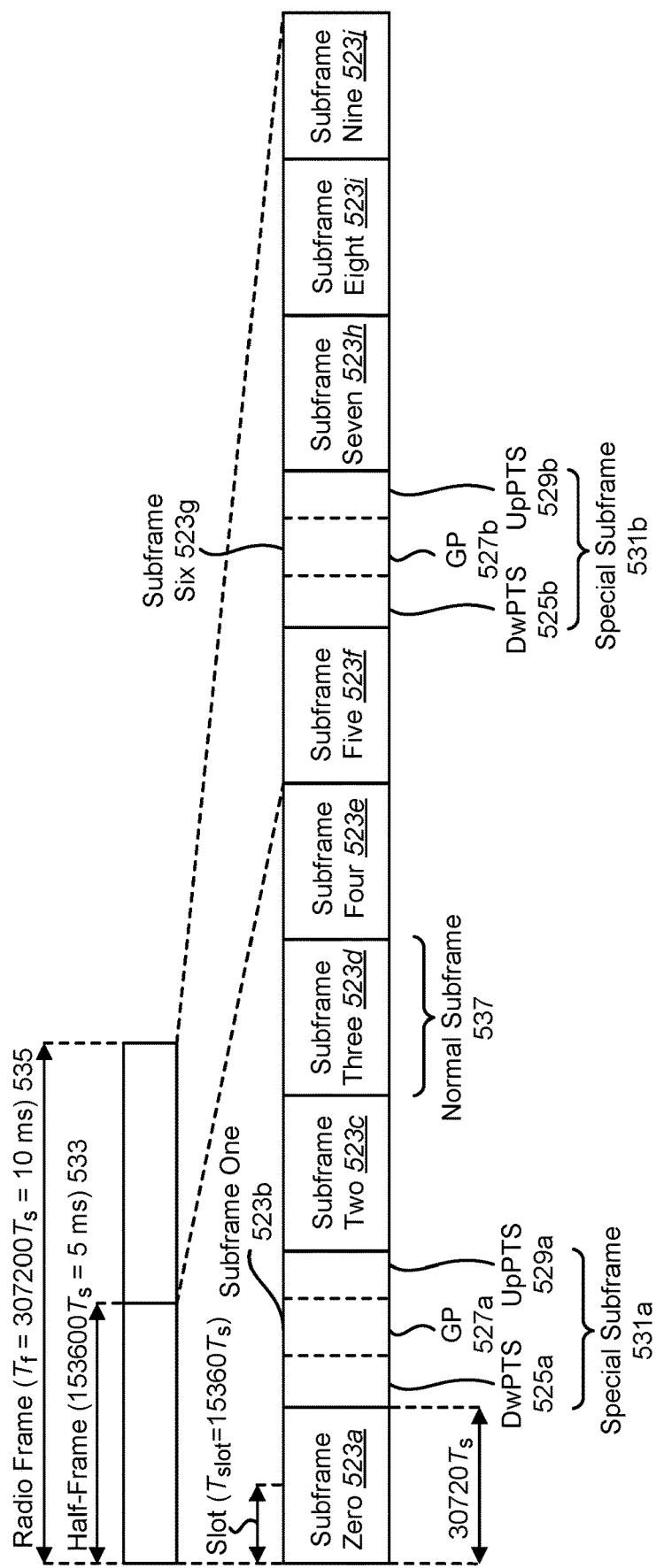
FIG. 5 is a diagram illustrating one example of a radio frame that may be used in accordance with the systems and methods disclosed herein.

FIG. 5 is a diagram illustrating one example of a radio frame 535 that may be used in accordance with the systems and methods disclosed herein. This radio frame 535 structure may provide a frame structure type 2 for TDD. Each radio frame 535 may have a length of $T_f = 307200 \cdot T_s = 10$ ms, where $T_f$ is a radio frame 535 duration and $T_s$ is a time unit equal to $$\frac{1}{(15000 \times 2048)}$$

seconds. The radio frame 535 may include two half-frames 533, each having a length of $153600 \cdot T_s = 5$ ms. Each half-frame 533 may include five subframes 523a-e, 523f-j each having a length of $30720 \cdot T_s = 1$ ms.

TDD UL/DL configurations 0-6 are given below in Table 1 (from Table 4.2-2 in 3GPP TS 36.211). UL/DL configurations with both 5 millisecond (ms) and 10 ms downlink-to-uplink switch-point periodicity may be supported. In particular, seven UL/DL configurations are specified in 3GPP specifications, as shown in Table 1 below. In Table 1, "D" denotes a downlink subframe, "S" denotes a special subframe and "U" denotes a UL subframe.

TABLE 1

| TDD UL/DL Con- figuration Number | Downlink- to-Uplink Switch-Point Periodicity | Subframe Number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1 above, for each subframe in a radio frame, "D" indicates that the subframe is reserved for downlink transmissions, "U" indicates that the subframe is reserved for uplink transmissions and "S" indicates a special subframe with three fields: a downlink pilot time slot (DwPTS), a guard period (GP) and an uplink pilot time slot (UpPTS). The length of DwPTS and UpPTS is given in Table 2 (from Table 4.2-1 of 3GPP TS 36.211) subject to the total length of DwPTS, GP and UpPTS being equal to $30720 \cdot T_s = 1$ ms. In Table 2, "cyclic prefix" is abbreviated as "CP" and "configuration" is abbreviated as "Config" for convenience.

TABLE 2

| | Normal CP in downlink | | | Extended CP in downlink | | |
| | | UpPTS | | | UpPTS | |
| Special Subframe Config | DwPTS | Normal CP in uplink | Extended CP in uplink | DwPTS | Normal CP in uplink | Extended CP in uplink |
|---|---|---|---|---|---|---|
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | 4384 · $T_s$ | 5120 · $T_s$ |
| 5 | 6592 · $T_s$ | 4384 · $T_s$ | 5120 · $T_s$ | 20480 · $T_s$ | | |
| 6 | 19760 · $T_s$ | | | 23040 · $T_s$ | | |
| 7 | 21952 · $T_s$ | | | — | — | — |
| 8 | 24144 · $T_s$ | | | — | — | — |

UL/DL configurations with both 5 ms and 10 ms downlink-to-uplink switch-point periodicity are supported. In the case of 5 ms downlink-to-uplink switch-point periodicity, the special subframe exists in both half-frames. In the case of 10 ms downlink-to-uplink switch-point periodicity, the special subframe exists in the first half-frame only. Subframes 0 and 5 and DwPTS may be reserved for downlink transmission. UpPTS and the subframe immediately following the special subframe may be reserved for uplink transmission.

In accordance with the systems and methods disclosed herein, some types of subframes 523 that may be used include a downlink subframe, an uplink subframe and a special subframe 531. In the example illustrated in FIG. 5, which has a 5 ms periodicity, two standard special subframes 531a-b are included in the radio frame 535. The remaining subframes 523 are normal subframes 537.

The first special subframe 531a includes a downlink pilot time slot (DwPTS) 525a, a guard period (GP) 527a and an uplink pilot time slot (UpPTS) 529a. In this example, the first standard special subframe 531a is included in subframe one 523b. The second standard special subframe 531b includes a downlink pilot time slot (DwPTS) 525b, a guard period (GP) 527b and an uplink pilot time slot (UpPTS) 529b. In this example, the second standard special subframe 531b is included in subframe six 523g. The length of the DwPTS 525a-b and UpPTS 529a-b may be given by Table 4.2-1 of 3GPP TS 36.211 (illustrated in Table 2 above) subject to the total length of each set of DwPTS 525, GP 527 and UpPTS 529 being equal to 30720·$T_s$=1 ms.

Each subframe i 523a-j (where i denotes a subframe ranging from subframe zero 523a (e.g., 0) to subframe nine 523j (e.g., 9) in this example) is defined as two slots, 2i and 2i+1 of length $T_{slot}$=15360·$T_s$=0.5 ms in each subframe 523. For example, subframe zero (e.g., 0) 523a may include two slots, including a first slot.

UL/DL configurations with both 5 ms and 10 ms downlink-to-uplink switch-point periodicity may be used in accordance with the systems and methods disclosed herein. FIG. 5 illustrates one example of a radio frame 535 with 5 ms switch-point periodicity. In the case of 5 ms downlink-to-uplink switch-point periodicity, each half-frame 533 includes a standard special subframe 531a-b. In the case of 10 ms downlink-to-uplink switch-point periodicity, a special subframe 531 may exist in the first half-frame 533 only.

Subframe zero (e.g., 0) 523a and subframe five (e.g., 5) 523f and DwPTS 525a-b may be reserved for downlink transmission. The UpPTS 529a-b and the subframe(s) immediately following the special subframe(s) 531a-b (e.g., subframe two 523c and subframe seven 523h) may be reserved for uplink transmission. It should be noted that, in some implementations, special subframes 531 may be considered DL subframes in order to determine a set of DL subframe associations that indicate UCI transmission uplink subframes of a UCI transmission cell.

LTE license access with TDD may have the special subframe as well as the normal subframe. The lengths of DwPTS, GP and UpPTS may be configured by using a special subframe configuration. Any one of the following ten configurations may be set as a special subframe configuration.

1) Special subframe configuration 0: DwPTS consists of 3 OFDM symbols. UpPTS consists of 1 single carrier frequency-division multiple access (SC-FDMA) symbol.

2) Special subframe configuration 1: DwPTS consists of 9 OFDM symbols for normal CP and 8 OFDM symbols for extended CP. UpPTS consists of 1 SC-FDMA symbol.

3) Special subframe configuration 2: DwPTS consists of 10 OFDM symbols for normal CP and 9 OFDM symbols for extended CP. UpPTS consists of 1 SC-FDMA symbol.

4) Special subframe configuration 3: DwPTS consists of 11 OFDM symbols for normal CP and 10 OFDM symbols for extended CP. UpPTS consists of 1 SC-FDMA symbol.

5) Special subframe configuration 4: DwPTS consists of 12 OFDM symbols for normal CP and 3 OFDM symbols for extended CP. UpPTS consists of 1 SC-FDMA symbol for normal CP and 2 SC-FDMA symbol for extended CP.

6) Special subframe configuration 5: DwPTS consists of 3 OFDM symbols for normal CP and 8 OFDM symbols for extended CP. UpPTS consists of 2 SC-FDMA symbols.

7) Special subframe configuration 6: DwPTS consists of 9 OFDM symbols. UpPTS consists of 2 SC-FDMA symbols.

8) Special subframe configuration 7: DwPTS consists of 10 OFDM symbols for normal CP and 5 OFDM symbols for extended CP. UpPTS consists of 2 SC-FDMA symbols.

9) Special subframe configuration 8: DwPTS consists of 11 OFDM symbols. UpPTS consists of 2 SC-FDMA symbols. Special subframe configuration 8 may be configured only for normal CP.

10) Special subframe configuration 9: DwPTS consists of 6 OFDM symbols. UpPTS consists of 2 SC-FDMA symbols. Special subframe configuration 9 may be configured only for normal CP.

Figure 6:
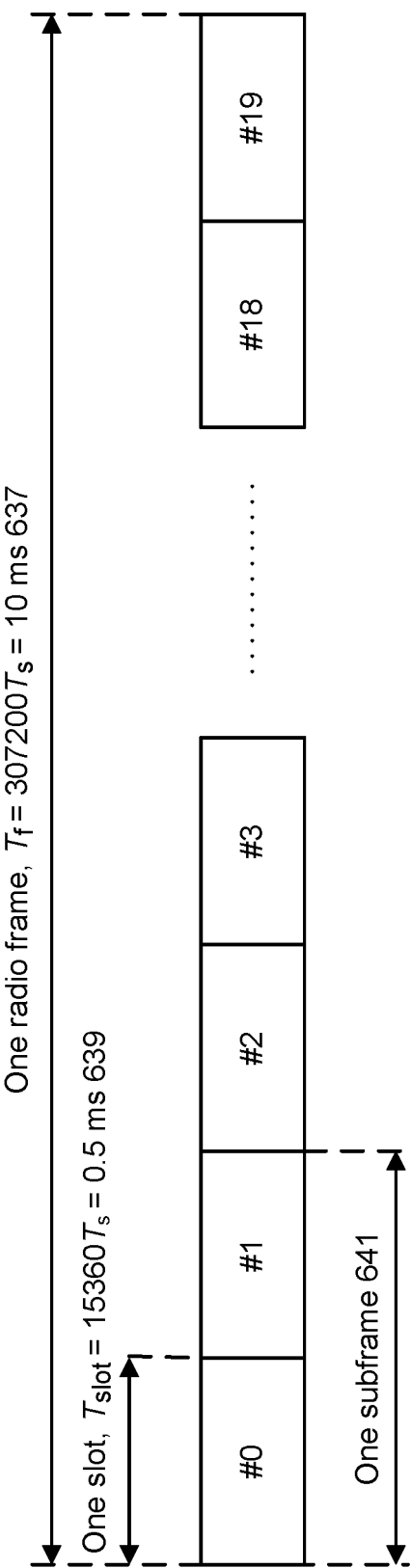
FIG. 6 is a diagram illustrating another example of a radio frame that may be used in accordance with the systems and methods disclosed herein.

FIG. 6 is a diagram illustrating another example of a radio frame 637 that may be used in accordance with the systems and methods disclosed herein. This radio frame 637 structure may provide a frame structure type 1 for FDD. Each radio frame 637 may have a length of $T_f=307200 \cdot T_s=10$ ms, where $T_f$ is a radio frame 637 duration and $T_s$ is a time unit equal to $$\frac{1}{(15000 \times 2048)}$$

seconds.

The radio frame 637 may include subframes 641. Each subframe 641 may be defined as two slots 639 of length $T_{slot}=15360 \cdot T_s=0.5$ ms in each subframe 641. The radio frame 637 includes twenty slots 639 (e.g., slots 0-19).

Figure 7:
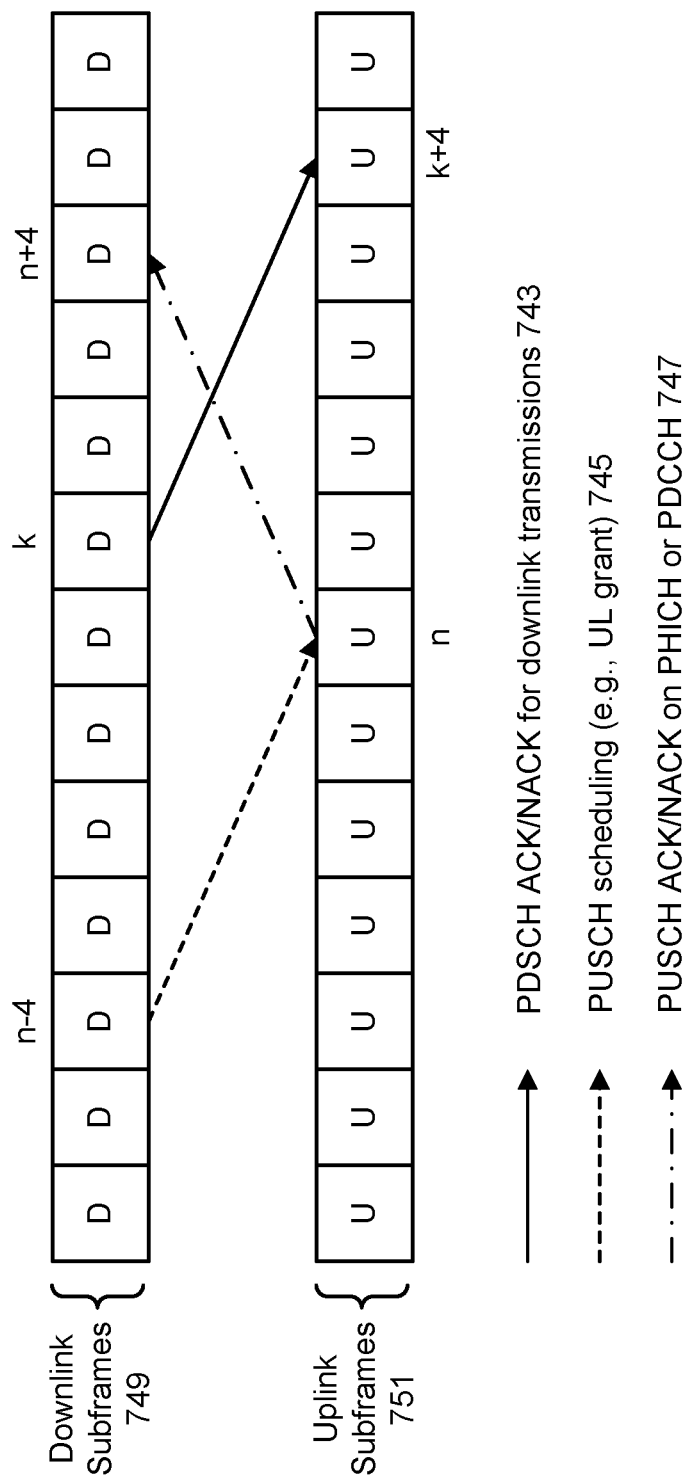
FIG. 7 is a diagram illustrating an example of timing for FDD cell operation.

FIG. 7 is a diagram illustrating an example of timing for FDD cell operation. For example, FIG. 7 illustrates some FDD association timing and operations. In particular, FIG. 7 illustrates a series of downlink subframes 749 (denoted "D") and a series of uplink subframes (denoted "U") 751. For FDD or frequency division duplex and time division duplex (FDD-TDD) and primary cell frame structure 1, the service cell operation may include several functions and corresponding timings. One function with corresponding timing may be PDSCH HARQ-ACK feedback timing 743. For FDD or FDD-TDD and primary cell frame structure 1, the HARQ-ACK for serving cell c is reported for the PDSCH received in subframe n−4 in serving cell c.

Another function (e.g., a second function) with corresponding timing may be PUSCH scheduling and transmission timing 745. For FDD and normal HARQ operation, the UE 102 may, upon detection on a given serving cell of a PDCCH or enhanced PDCCH (EPDCCH) with DCI format 0/4 and/or a PHICH transmission in subframe n intended for the UE 102, adjust the corresponding PUSCH transmission in subframe n+4 according to the PDCCH/EPDCCH and PHICH information. For FDD-TDD and normal HARQ operation and a PUSCH for serving cell c with frame structure type 1, the UE 102 may, upon detection of a PDCCH/EPDCCH with DCI format 0/4 and/or a PHICH transmission in subframe n intended for the UE 102, adjust the corresponding PUSCH transmission for serving cell c in subframe n+4 according to the PDCCH/EPDCCH and PHICH information.

Another function (e.g., a third function) with corresponding timing may be HARQ-ACK feedback timing for a PUSCH transmission 747. For FDD, and serving cell with frame structure type 1, a HARQ-ACK received on the physical hybrid automatic repeat request (ARQ) indicator channel (PHICH) assigned to a UE 102 in subframe i is associated with the PUSCH transmission in subframe i−4. For FDD-TDD, and serving cell with frame structure type 1, and a UE 102 not configured to monitor PDCCH/EPDCCH in another serving cell with frame structure type 2 for scheduling the serving cell, a HARQ-ACK received on the PHICH assigned to a UE 102 in subframe i may be associated with the PUSCH transmission in subframe i−4. Besides PHICH feedback, PUSCH HARQ-ACK may be asynchronous by using a PDCCH/EPDCCH with DCI format 0/4 by a new date indicator (NDI). Accordingly, FDD based timing may follow a rule of 4 milliseconds (ms) (e.g., 4 regular or legacy TTI, as illustrated in FIG. 7).

Figure 8:
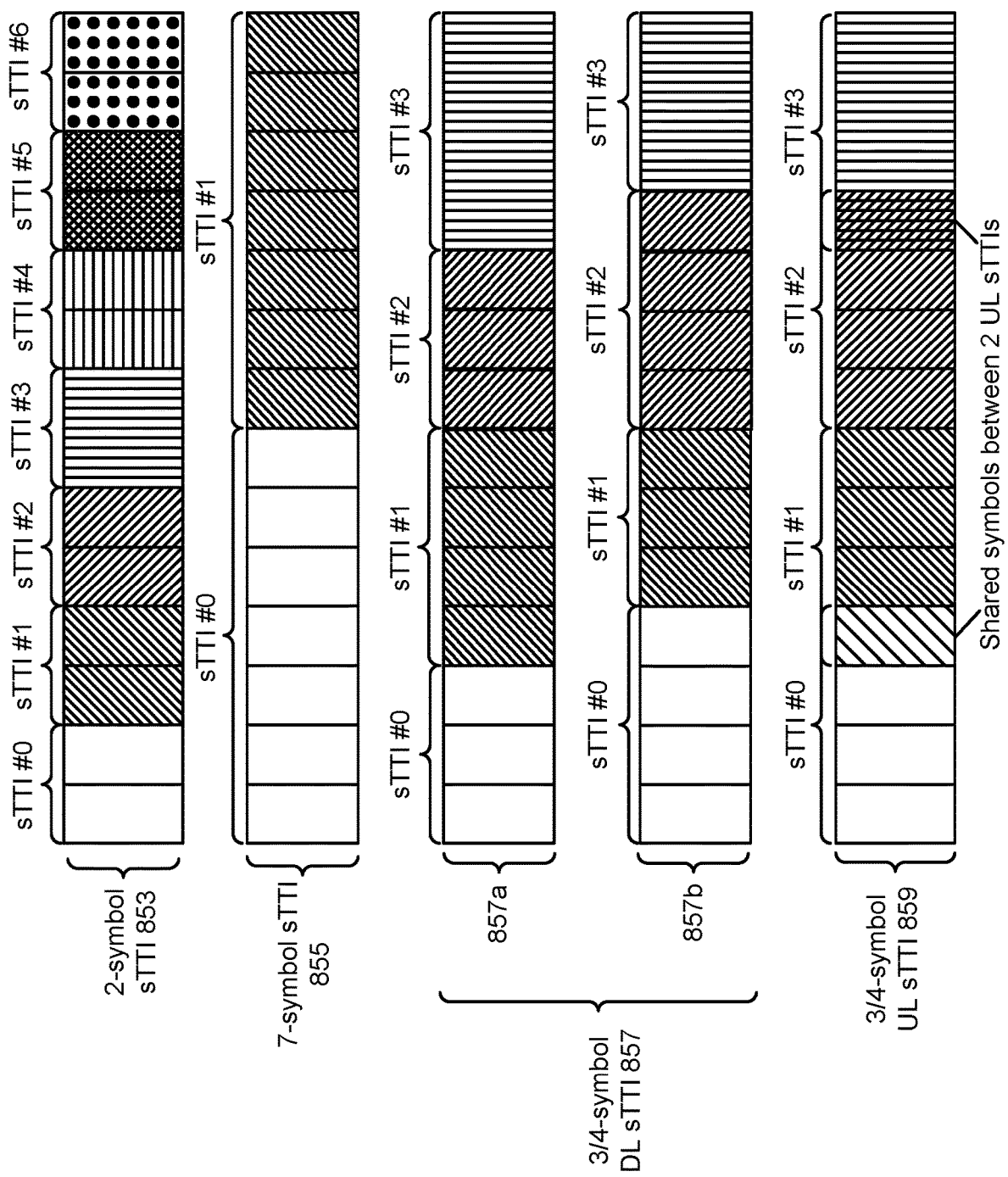
FIG. 8 is a diagram illustrating examples of timings with shortened transmission time intervals (sTTIs) for latency reduction.

FIG. 8 is a diagram illustrating examples of timings with shortened transmission time intervals (sTTIs) for latency reduction. For example, FIG. 8 illustrates examples of sTTI sizes and configurations for DL and UL. Shortened TTI (sTTI) lengths from 1 symbol, 2 symbols, 3 and 4 (3/4) symbols and/or 7 symbols may be defined for latency reduction. With a reduced TTI size, the processing time of a sTTI subframe may also be reduced. Thus, the association timing and RTT may be reduced accordingly. From a UE's perspective, a UE 102 may not be expected to receive DL sTTIs with different sizes within a legacy subframe. Additionally or alternatively, a UE 102 may not be expected to transmit UL sTTIs with different sizes within a legacy subframe.

Some examples of sTTI sizes and configurations are illustrated in FIG. 8. For 2-symbol sTTI 853, each legacy subframe may be divided into 7 2-symbol sTTIs. For a slot based 7-symbol sTTI 855, each legacy subframe may be divided into 2 7-symbol sTTIs. For 3 and 4 (3/4) symbol DL sTTI 857, there are two examples illustrated in FIG. 8. In one example, each slot is divided into a 3-symbol sTTI followed by a 4-symbol sTTI 857a. In another example, each slot is divided into a 4-symbol sTTI followed by a 3-symbol sTTI, 857b. For 3/4 symbol UL sTTI 859, each slot may be divided into two 4-symbol sTTIs that share a common symbol in the middle symbol of the slot.

One or more approaches may be used to determine the DL and UL sTTI sizes. In one case, the DL sTTI size may be (e.g., is always) the same as the UL sTTI size for a given UE 102. The same sTTI size may be applied to all DL and UL channels (e.g., sPUSCH, sPUCCH, sPDSCH, etc.). For FDD or FDD-TDD and primary cell frame structure 1, as an extension, if the same sTTI size is used on both DL and UL, the association timing may be proportionally scaled with the sTTI sizes (e.g., the length of 4 sTTI for the PDSCH HARQ-ACK feedback timing, PUSCH scheduling and transmission timing, and/or HARQ-ACK feedback timing for a PUSCH transmission). Considering timing advances and processing delay of encoding or decoding, the 4 sTTI length may not be sufficient in some instances (particularly for very short sTTIs, for example). Thus, a more general way to describe the timing may be a (n+k) reference sTTI length association, where k may be smaller or greater than 4 for certain association timings. Accordingly, although some configurations of the systems and methods discussed herein are described in terms of "n+4" for a reference sTTI length association, the systems and methods may include other implementations where k is utilized instead of 4.

In another case, the DL sTTI size may be the same or different from the UL sTTI size, and the DL sTTI size and the UL sTTI size may be configured independently. Furthermore, the sTTI size may be configured independently for each channel (e.g., sPUCCH and sPUSCH may be configured with different sTTI sizes for a UE 102, sPHICH and sPDSCH may be configured with different sTTI sizes, etc.).

One remaining issue is how the serving cell should operate if the sTTI size of the DL is different from the sTTI size of the UL. The systems and methods discussed herein provide detailed association timing when the sTTI sizes are different between DL and UL.

In Approach 1, the association timing may follow (e.g., 4 times) the longer TTI size between DL and UL. Table 3 summarizes the association timing following Approach 1. In particular, Table 3 illustrates examples of association timing for sTTIs with different sTTI lengths. It should be noted that in Table 3, the timing is determined based on the larger TTI size between DL and UL. In one case, the DL sTTI size is smaller than the UL sTTI size, and multiple DL sTTIs may be mapped to a single UL sTTI. In another case, the DL sTTI size is larger than the UL sTTI size, and multiple UL sTTIs may be mapped to a single DL sTTI. It is also possible that the sTTI is configured only for DL or only for UL. The UL sTTI may be sTTI for a sPUCCH, or a sPUSCH depending on the corresponding timing. The sTTI for a sPUSCH and a sPUCCH may be different. These situations are discussed in more detail below.

TABLE 3

| UL TTI sizes | DL TTI sizes | | | |
|---|---|---|---|---|
| | 2-symbol | 3/4-symbol | 7-symbol | 14-symbol |
| 2-symbol | 8 symbols | 14 symbols = 1 ms | 28 symbols = 2 ms | 4 ms |
| 3/4-symbol | 14 symbols = 1 ms | 14 symbols = 1 ms | 28 symbols = 2 ms | 4 ms |
| 7-symbol | 28 symbols = 2 ms | 28 symbols = 2 ms | 28 symbols = 2 ms | 4 ms |
| 14-symbol | 4 ms | 4 ms | 4 ms | 4 ms |

In Case 1, the DL TTI is shorter than the UL TTI. In Case 1, for FDD or FDD-TDD and primary cell frame structure 1, the DL sTTI size is smaller than the UL sTTI size. Thus, multiple DL sTTIs may be mapped to a single UL TTI or sTTI. The timing relationship may be based on the UL TTI sizes.

More detail is given regarding sPDSCH HARQ-ACK feedback timing as follows. For PDSCH HARQ-ACK reporting, the HARQ-ACK of multiple DL sTTIs may be aggregated and reported in a single UL sTTI or TTI. All DL sTTIs that end within the UL sTTI n−4 may be included in the same UL report in UL sTTI n, and so on. The UL sTTI may refer to the sTTI size of a sPUCCH. The UL sTTI may be the sTTI of a sPUSCH if a sPUSCH is scheduled in the reporting UL sTTI.

Figure 9:
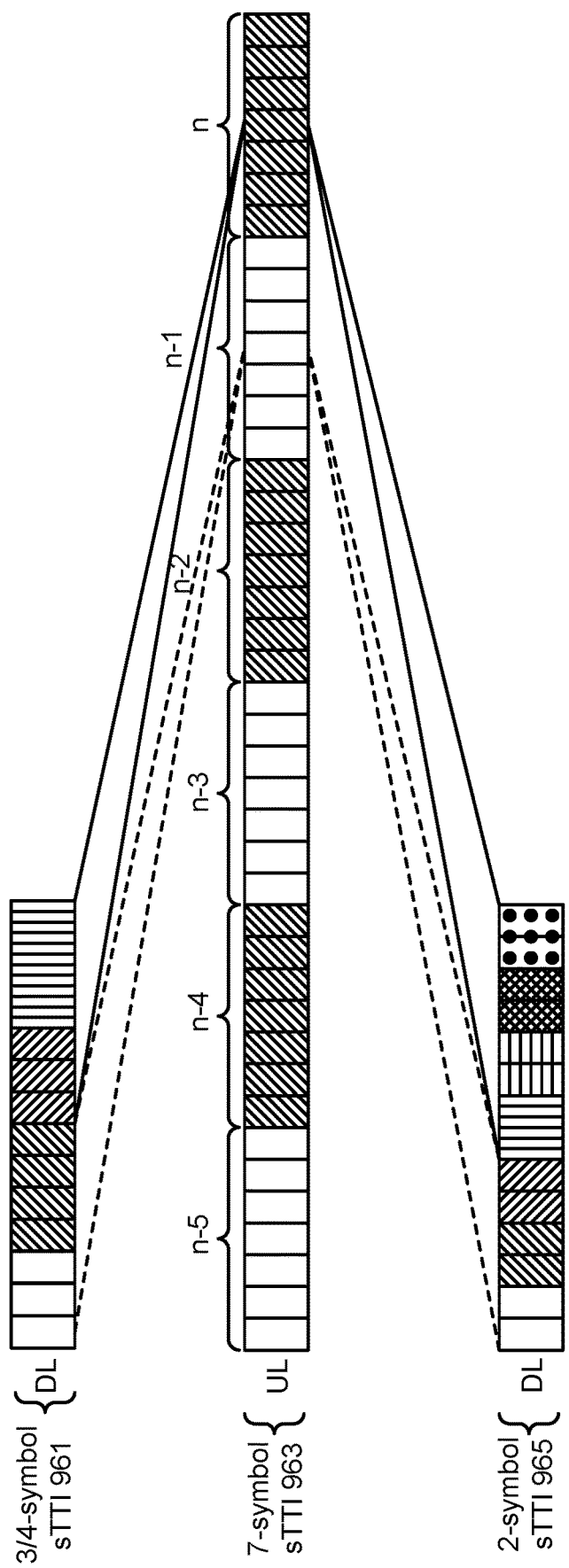
FIG. 9 is a diagram illustrating examples of PDSCH HARQ-ACK association with 7-symbol UL sTTI.

FIG. 9 is a diagram illustrating examples of PDSCH HARQ-ACK association with 7-symbol UL sTTI 963. In particular, FIG. 9 illustrates examples of a mapping when the UL sTTI size is 7-symbol and the DL sTTI size is 3 and 4-symbol (3/4-symbol) or the DL sTTI size is 2-symbol. A 7-symbol UL sTTI 963 may associate with two 3/4-symbol DL sTTIs 961. For a 2-symbol sTTI 965 crossing a slot boundary, the HARQ-ACK may be reported together with sTTIs in the later slot. Thus, a 7-symbol UL sTTI 963 may associate with 3 or 4 2-symbol sTTIs 965 for UL sTTI in slot 0 and slot 1, respectively.

Figure 10:
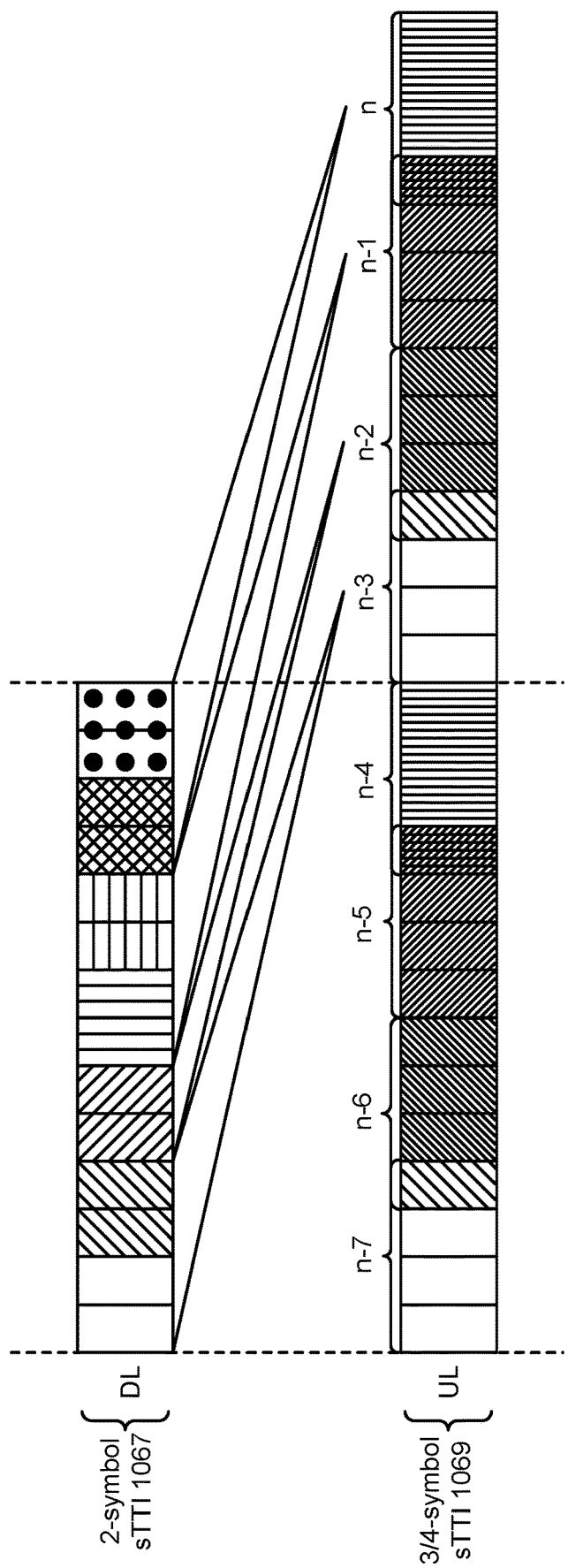
FIG. 10 is a diagram illustrating examples of PDSCH HARQ-ACK association with 3/4-symbol UL sTTI.

FIG. 10 is a diagram illustrating examples of PDSCH HARQ-ACK association with 3/4-symbol UL sTTI 1069. In particular, FIG. 10 illustrates the mapping when the UL sTTI size is 3/4-symbol and DL sTTI size is 2-symbol. All 2-symbol DL sTTIs 1067 that end within the UL sTTI n−4 may be included in the same UL report in UL sTTI n, and so on. Thus, a UL sTTI may associate with 2 DL sTTIs or 1 DL sTTI depending on the sTTI location in a subframe.

More detail regarding sPUSCH scheduling and transmission timing is given as follows. Following the concept of association timing based on a longer sTTI size between DL and UL, the timing delay may be determined by an UL sTTI as given in Table 3. A sPUSCH or PUSCH may be scheduled by a DCI format 0/4 and/or a PHICH or sPHICH transmission in subframe n intended for the UE 102. The sTTI of the UL may refer to the configured sTTI of sPUSCH.

For FDD and normal HARQ operation, the UE 102 may, upon detection on a given serving cell of a PDCCH, EPDCCH, sPDCCH or sEPDCCH with DCI format 0/4 and/or a PHICH or sPHICH transmission in UL sTTI n intended for the UE 102, adjust the corresponding PUSCH transmission in UL sTTI n+4 according to the PDCCH, EPDCCH, sPDCCH or sEPDCCH and/or PHICH or sPHICH information. The association timing may be the same as the PDSCH HARQ feedback timing described above. Since there may be multiple DL sTTIs included in the UL sTTI, multiple methods may be considered.

In Method A1, the PDCCH, EPDCCH, sPDCCH or sEPDCCH and/or a PHICH or sPHICH may only be carried in the latest DL sTTI that ends within a range of the UL sTTI n. This may provide slightly lower latency between a UL grant and the UL transmission.

In Method A2, the PDCCH, EPDCCH, sPDCCH or sEPDCCH and/or a PHICH or sPHICH may only be carried in the earliest DL sTTI that ends within a range of UL sTTI n. This may provide slightly more processing time between a UL grant and the UL transmission. In a variation of Method A2, the PDCCH, EPDCCH, sPDCCH or sEPDCCH and/or a PHICH or sPHICH may only be carried in the first DL sTTI that starts within the range of UL sTTI n.

In Method A3, the PDCCH, EPDCCH, sPDCCH or sEPDCCH and/or a PHICH or sPHICH may be carried in any DL sTTI that ends within the range of UL sTTI n. Method A3 may provide better flexibility on sPUSCH scheduling. However, in case of an sPHICH indication, the sPHICH may be located in the same DL sTTI position within the subframe as the sPUSCH scheduling sPDCCH or sEPDCCH.

Figure 11:
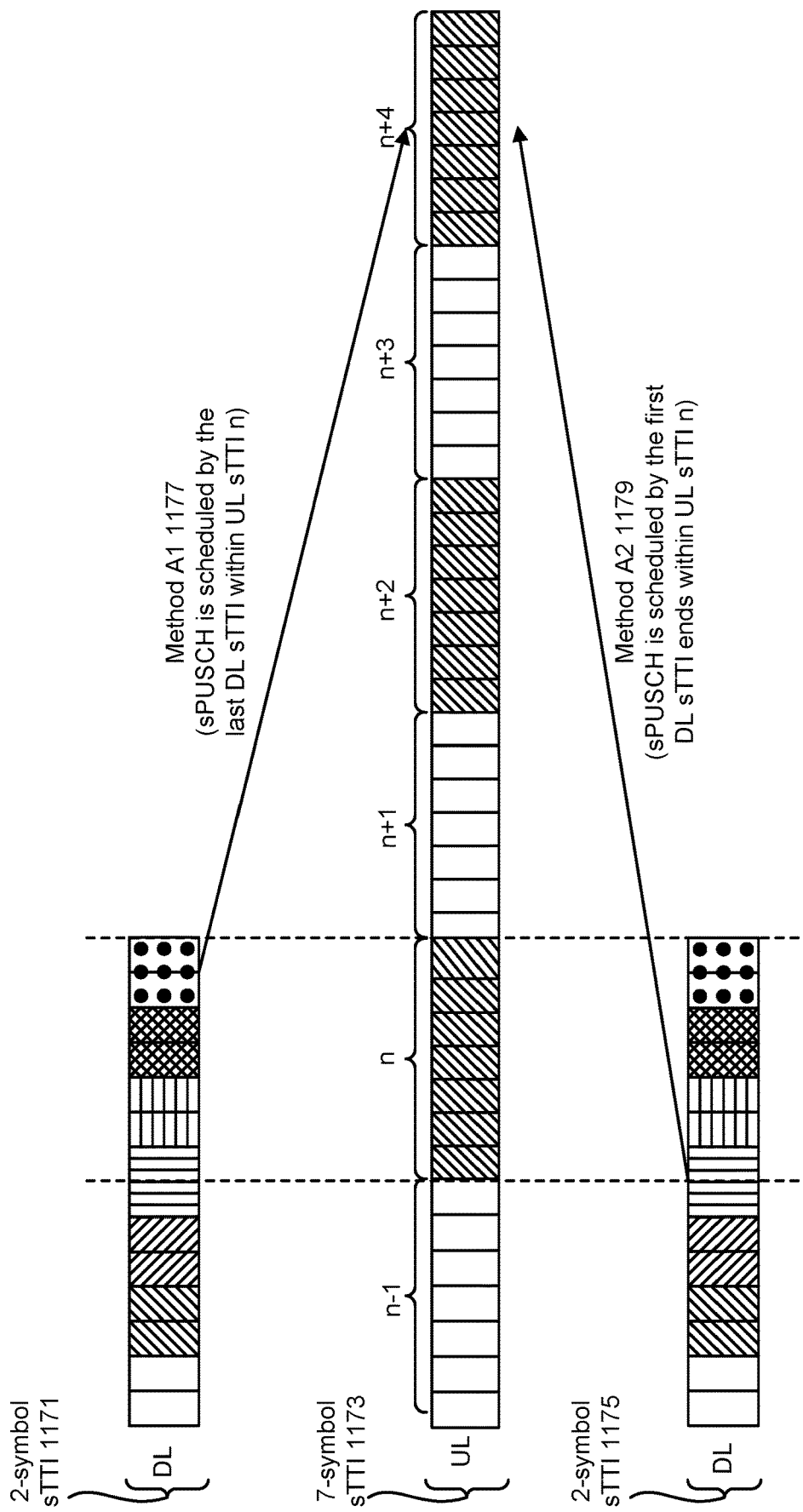
FIG. 11 is a diagram illustrating examples of PUSCH scheduling timing with sTTI.

FIG. 11 is a diagram illustrating examples of PUSCH scheduling timing with sTTI. In particular, FIG. 11 illustrates an example of 2-symbol DL sTTI 1171 and 7-symbol UL sTTI 1173. As illustrated in FIG. 11, there may be 4 DL sTTIs within the UL sTTI n. With Method A1 1177, only the last DL sTTI (of the 2-symbol DL sTTI 1171) may be used to schedule an sPUSCH transmission in UL sTTI n+4.

Additionally, FIG. 11 illustrates another example with 2-symbol DL sTTI 1175 and 7-symbol UL sTTI 1173. There may be 4 DL sTTIs within the UL sTTI n. With the Method A2 1179, only the first DL sTTI that ends within the UL sTTI n may be used to schedule an sPUSCH transmission in UL sTTI n+4.

More detail regarding HARQ-ACK feedback timing for a sPUSCH transmission is given as follows. The multiple DL sTTI mapping to a single UL sTTI issue exists for HARQ-ACK feedback of a sPUSCH transmission on a DL sTTI (particularly if a sPHICH is specified and used, for example). This timing also defines the minimum delay required for a DCI indicating a retransmission of a sPUSCH. The UL sTTI may refer to the sTTI size configured for sPUSCH for the HARQ-ACK feedback timing of sPUSCH transmission.

Following the concept of association timing based on longer sTTI size between DL and UL, the timing delay may be determined by an UL sTTI as given in Table 3. A HARQ-ACK received on the sPHICH assigned to a UE 102 within UL sTTI i may be associated with the sPUSCH transmission in UL sTTI i−4. Since there may be multiple DL sTTIs in the UL sTTI i, methods may be defined for the PUSCH scheduling.

In Method B1, the sPHICH may only be carried in the latest DL sTTI that ends within the range of UL sTTI i. This provides slightly more processing time between a sPUSCH transmission and HARQ-ACK feedback. For consistency, if Method A1 above is used for UL sPUSCH scheduling, Method B1 here may be used for HARQ-ACK feedback timing of a sPUSCH transmission.

In Method B2, the sPHICH may only be carried in the first DL sTTI that ends within the range of UL sTTI i. This may provide slightly faster HARQ-ACK feedback. For consistency, if Method A2 above is used for UL sPUSCH scheduling, Method B2 here may be used for HARQ-ACK feedback timing of a sPUSCH transmission.

In a variation of Method B2, the sPHICH may only be carried in the first DL sTTI that starts within the range of UL sTTI i to report HARQ-ACK for sPUSCH transmission in UL sTTI i-4. For consistency, if Method A2 above is used for UL sPUSCH scheduling, Method B2 here should be used for HARQ-ACK feedback timing of a sPUSCH transmission.

In Method B3, the sPHICH may be carried in any DL sTTI that ends within the range of UL sTTI i. The sPHICH may (e.g., should) be located in the same DL sTTI position within the subframe as the DL sTTI that schedules the sPUSCH.

Figure 12:
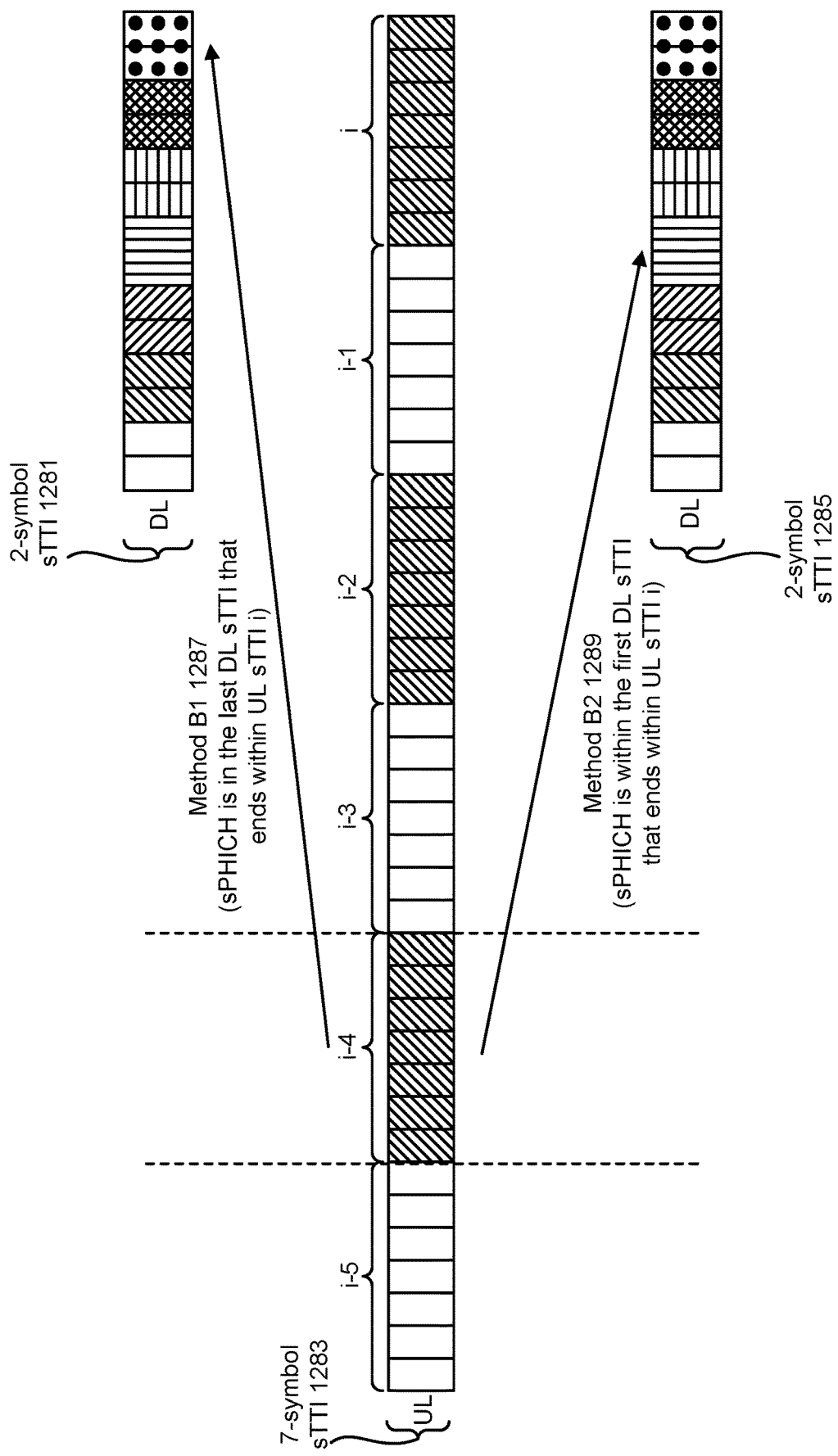
FIG. 12 is a diagram illustrating examples of sPUSCH HARQ-ACK feedback timing on a sPHICH.

FIG. 12 is a diagram illustrating examples of sPUSCH HARQ-ACK feedback timing on a sPHICH. In particular, FIG. 12 illustrates examples with 2-symbol DL sTTI 1281, 1285 and 7-symbol UL sTTI 1283. As illustrated in FIG. 12, there may be 4 DL sTTIs within the UL sTTI i. With Method B1 1287, only the last DL sTTI that ends within UL sTTI i may be used to carry HARQ-ACK on the sPHICH for sPUSCH transmission in UL sTTI i-4.

As illustrated in FIG. 12, there are 4 DL sTTIs within the UL sTTI i. With Method B2 1289, only the first DL sTTI that ends within UL sTTI i may be used to carry HARQ-ACK on sPHICH for sPUSCH transmission in UL sTTI i-4.

For Case 1, the DL TTI is shorter than UL TTI, and the timing may be based on UL sTTI sizes. Case 1 may be beneficial since it requires less adjustment on the UL (e.g., UE 102) side, and more flexibility at DL scheduling. Any DL sTTI sizes that are smaller or equal to the UL sTTI size may be scheduled.

Therefore, in some ways of sTTI operation, an eNB 160 may (e.g., should) always configure a longer UL sTTI size than the DL sTTI size. From the UE's perspective, a UE 102 may (e.g., should) always expect that the size of a UL sTTI is longer than a DL sTTI.

In Case 2, the UL sTTI is shorter than the DL TTI. In Case 2, for FDD or FDD-TDD and primary cell frame structure 1, the UL sTTI size is smaller than the UL sTTI size. Thus, multiple UL sTTIs may be mapped to a single DL TTI or sTTI. The timing relationship may be based on the DL TTI sizes. The UL sTTI may be a sTTI for a sPUCCH, or a sPUSCH depending on the corresponding timing. The sTTI for a sPUSCH and a sPUCCH may be different.

More detail regarding sPDSCH HARQ-ACK feedback timing is given as follows. For PDSCH HARQ-ACK reporting, the HARQ-ACK of a sPDSCH transmitted in DL sTTI n-4 may be reported on a UL sTTI within the DL sTTI n. Because the UL sTTI is smaller than the DL sTTI, a DL sTTI may contain multiple UL sTTIs. Several methods may be considered to determine which UL sTTI should be used for the HARQ-ACK reporting. The UL sTTI may refer to the sTTI size of a sPUCCH. The UL sTTI may be the sTTI of a sPUSCH if a sPUSCH is scheduled in the reporting UL sTTI.

In Method C1, the HARQ-ACK of a sPDSCH in DL sTTI n-4 is reported in the first UL sTTI that starts within the range of DL sTTI n. This may provide slightly lower latency between a sPDSCH and the HARQ-ACK feedback. As an alternative, the HARQ-ACK of a sPDSCH in DL sTTI n-4 may be reported in the earliest UL sTTI that ends within the range of DL sTTI n.

In Method C2, the HARQ-ACK of a sPDSCH in DL sTTI n-4 is reported in the last UL sTTI that ends within the range of DL sTTI n. This may provide a slightly longer time for the HARQ-ACK feedback.

In Method C3, the HARQ-ACK of a sPDSCH in DL sTTI n-4 may be reported in any UL sTTIs that start and end within the range of DL sTTI n. This may provide more flexibility of HARQ-ACK reporting and eNB scheduling. It should be noted that extra bits may be introduced in the DL sTTI n-4 sPDSCH DCI format to indicate which UL sTTI is used for the HARQ-ACK report within DL sTTI n. For example, an offset value may be used. If the offset value is 0, the first UL sTTI that starts within the range of DL sTTI n may be used to report HARQ-ACK. If the offset value is 1, the second UL sTTI that starts within the range of DL sTTI n may be used to report HARQ-ACK and so on.

Figure 13:
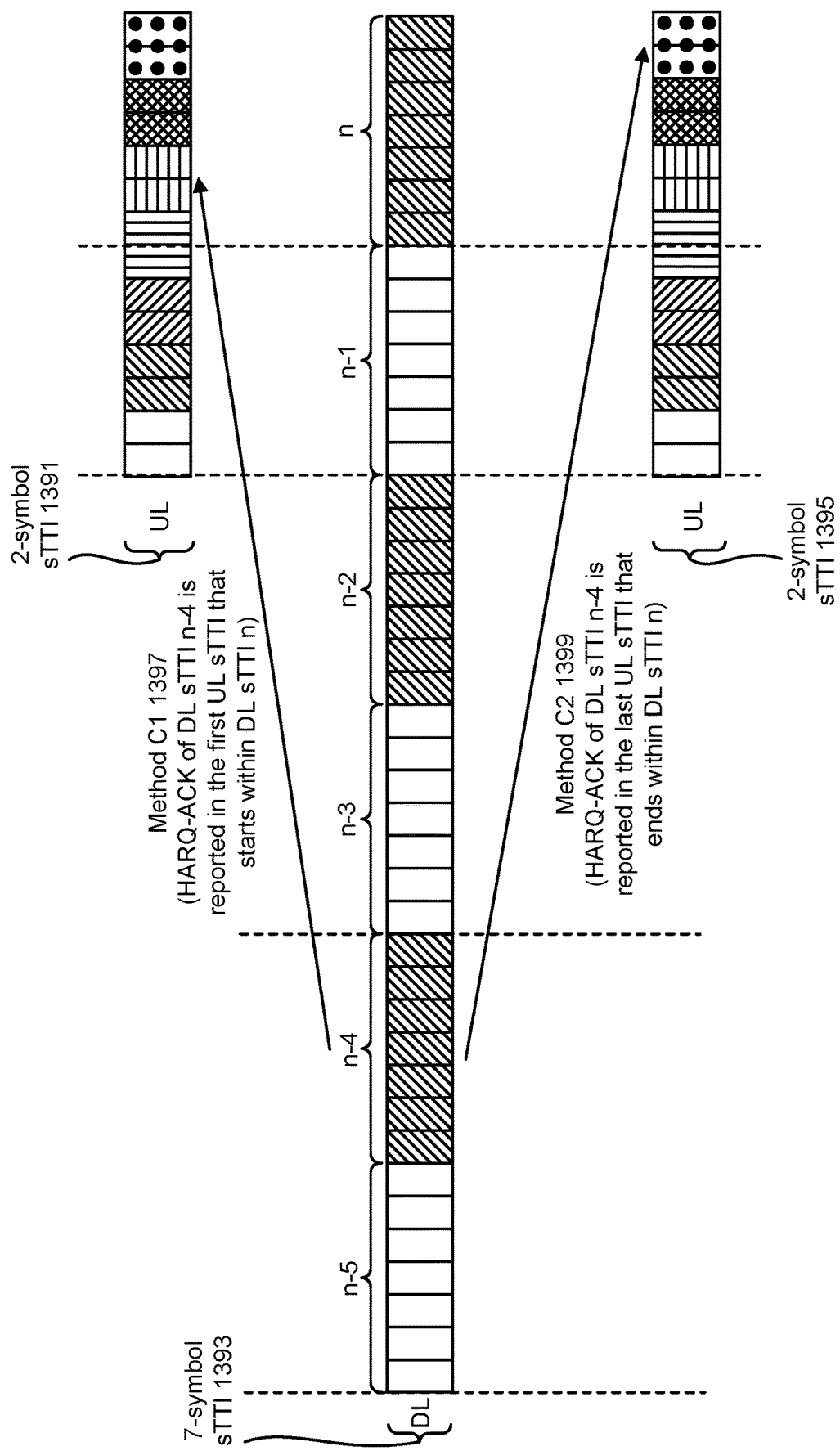
FIG. 13 is a diagram illustrating examples of PDSCH HARQ-ACK association with 7-symbol DL sTTI and 2-symbol UL sTTI.

FIG. 13 is a diagram illustrating examples of PDSCH HARQ-ACK association with 7-symbol DL sTTI 1393 and 2-symbol UL sTTI 1391, 1395. In particular, FIG. 13 shows an example with 2-symbol UL sTTI 1391, and 7-symbol DL sTTI 1393. There are 4 UL sTTIs within the DL sTTI n. With Method C1 1397, only the first UL sTTI that starts within DL sTTI n may be used to report HARQ-ACK for sPDSCH in DL sTTI n-4. Alternatively, the HARQ-ACK of a sPDSCH in DL sTTI n-4 may be reported in the earliest UL sTTI that ends within the range of DL sTTI n. In the example of Method C1 1397 in FIG. 13, the UL sTTI immediately before may be used instead.

Additionally, FIG. 13 shows another example with 2-symbol UL sTTI 1395 and 7-symbol DL sTTI 1393. There are 4 UL sTTIs within the DL sTTI n. With Method C2 1399, only the last UL sTTI that ends within DL sTTI n may be used to report HARQ-ACK for sPDSCH in DL sTTI n-4.

More detail regarding sPUSCH scheduling and transmission timing is given as follows. Following the concept of association timing based on longer sTTI size between DL and UL, the timing delay may be determined by a DL sTTI as given in Table 3. A sPUSCH or PUSCH within DL sTTI n+4 may be scheduled by a DCI format 0/4 and/or a PHICH or sPHICH transmission in subframe n intended for the UE 102. The sTTI of the UL may refer to the configured sTTI of sPUSCH.

For FDD and normal HARQ operation, the UE 102 may, upon detection on a given serving cell of a PDCCH, EPDCCH, sPDCCH or sEPDCCH with DCI format 0/4 and/or a PHICH or sPHICH transmission in DL sTTI n intended for the UE 102, adjust the corresponding PUSCH transmission in UL sTTI n+4 according to the PDCCH, EPDCCH, sPDCCH or sEPDCCH and/or PHICH or sPHICH information. Since there may be multiple UL sTTIs included in a DL sTTI, extra bits may be introduced in the DL sTTI n DCI format 0/4 to indicate which UL sTTI is scheduled for sPUSCH transmission within DL sTTI n+4.

Figure 14:
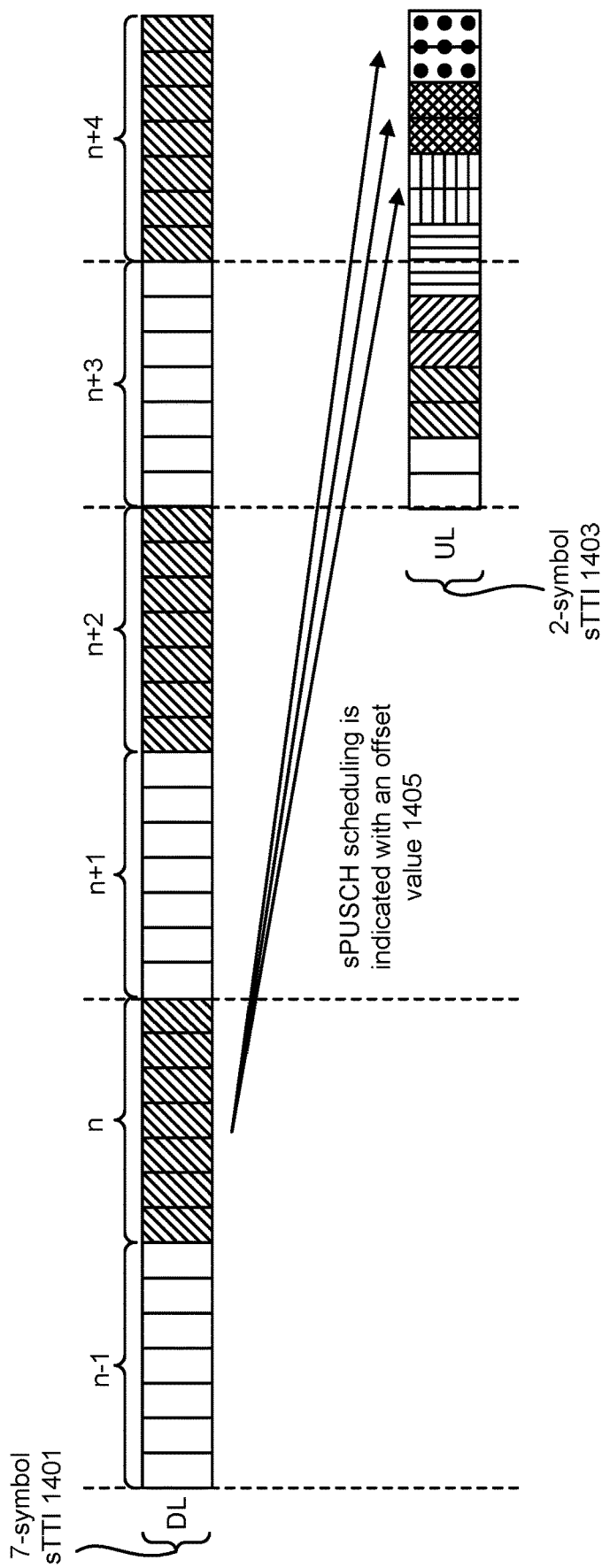
FIG. 14 is a diagram illustrating an example of sPUSCH scheduling from a DL sTTI.

FIG. 14 is a diagram illustrating an example of sPUSCH scheduling from a DL sTTI. In particular, FIG. 14 illustrates an example of 7-symbol sTTI 1401 and 2-symbol sTTI 1403. For example in FIG. 14, an offset value 1405 may be used. If the offset value 1405 is 0, the first UL sTTI that starts within the range of DL sTTI n may be scheduled for sPUSCH transmission. If the offset value 1405 is 1, the second UL sTTI that starts within the range of DL sTTI n may be scheduled for sPUSCH transmission and so on. In a case of sPHICH indication, each UL sPUSCH scheduling within DL sTTI n+4 may be linked to a different sPHICH resource in DL sTTI n.

More detail regarding HARQ-ACK feedback timing for a sPUSCH transmission is given as follows. The multiple UL sTTI mapping to a single DL sTTI issue exists for HARQ-ACK feedback of a sPUSCH transmission on a DL sTTI (particularly if a sPHICH is specified and used, for example). This timing may also define the minimum delay required for a DCI indicating a retransmission of a sPUSCH. The UL sTTI may refer to the sTTI size configured for sPUSCH for the HARQ-ACK feedback timing of sPUSCH transmission.

Figure 15:
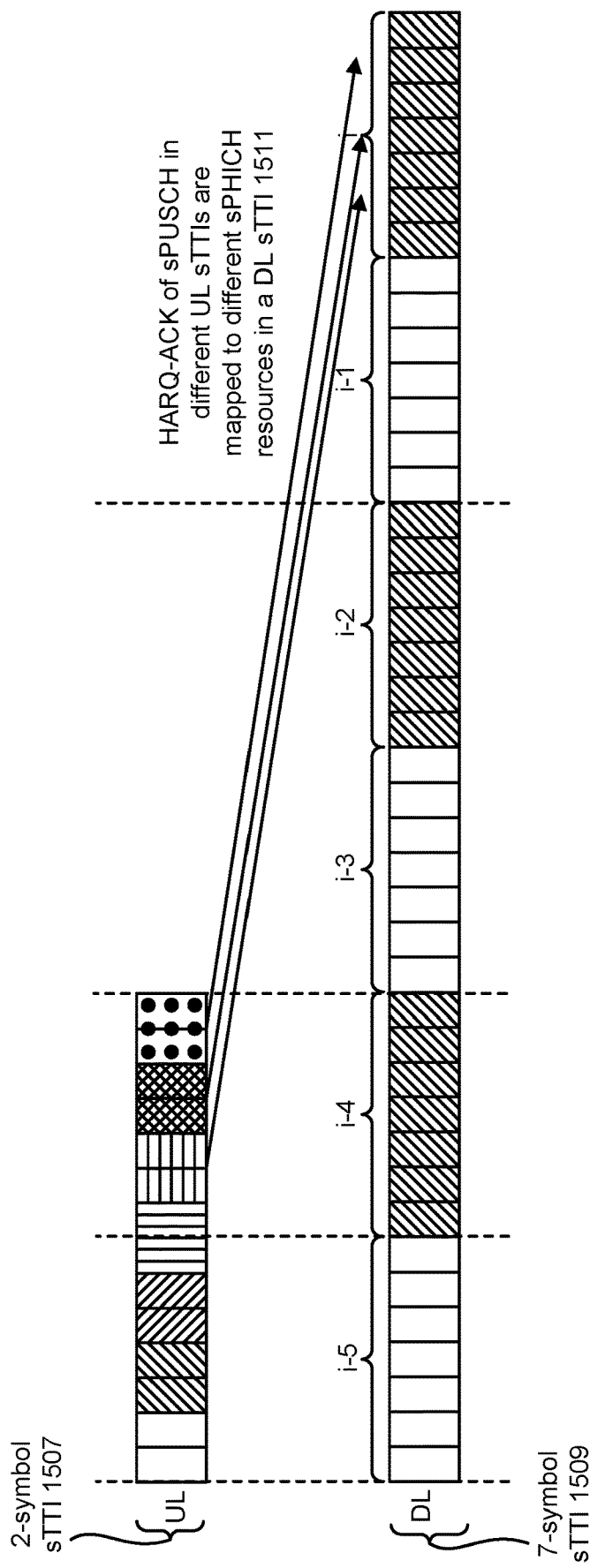
FIG. 15 is a diagram illustrating an example of mapping sPUSCH HARQ-ACK to sPHICH resources.

FIG. 15 is a diagram illustrating an example of mapping sPUSCH HARQ-ACK to sPHICH resources. In particular, FIG. 15 illustrates an example of 2-symbol sTTI 1507 and 7-symbol sTTI 1509. In the example illustrated in FIG. 15, each sPUSCH is mapped to a different sPHICH resource 1511. For instance, each UL sPUSCH transmission within DL sTTI i–4 may be linked to a different sPHICH resource in DL sTTI i, as illustrated in FIG. 15. The sPHICH resource may be explicitly configured for all UL sTTIs within a DL sTTI. The sPHICH resource may be mapped implicitly. For example, the PHICH resource of the first sPUSCH within DL sTTI i–4 may be configured, and the PHICH resources of other sPUSCH transmissions within DL sTTI i–4 may be mapped with an offset value. For instance, the sPUSCH of the second sPUSCH within DL sTTI i–4 may be mapped to the next sPHICH resource of the first sPUSCH and so on.

In both Case 1 and Case 2 above, the association timing between a transmission sTTI and the response/feedback sTTI may be 4 sTTI lengths, where the sTTI length may be determined by the longer sTTI length between UL sTTI and DL sTTI. The RTT may be reduced proportionally to 8 sTTI lengths, where the sTTI length may be determined by the longer sTTI length between UL sTTI and DL sTTI. Considering timing advances and processing delay of encoding or decoding, the 4 sTTI length may not be sufficient in some instances (particularly for very short sTTIs, for example). Thus, a more general way to describe the timing may be a (n+k) reference sTTI length association, where k may be smaller or greater than 4 for certain association timings. Accordingly, although some configurations of the systems and methods discussed herein are described in terms of "n+4" for a reference sTTI length association, the systems and methods may include other implementations where k is utilized instead of 4.

In Approach 2, the association timing may be smaller than (4 times, for example) the longer TTI size between DL and UL. For FDD timing, the current processing delay of 4 ms may be based on a 1 ms legacy TTI. It may be regarded as 1 ms TTI for the process of the transmitted subframe at the receiver, 1 ms TTI for preparing the response subframe, and a 1 ms TTI gap in between. Thus, the actual gap between the end of a subframe transmission and the corresponding response or feedback subframe is 3 TTIs.

With sTTI, the processing time for the received sTTI and preparation time for the response sTTI may be reduced proportionally (e.g., at least proportionally). Thus, if the DL and UL have different sTTI sizes, the gap between the end of a sTTI transmission and the corresponding response or feedback subframe may include one length of the transmission sTTI, one length of the response sTTI, and one length of the gap sTTI. To reduce latency, the gap sTTI may be based on the shorter TTI length between the transmission sTTI and the response sTTI.

The sTTI sizes may include 2-symbol, 3/4-symbol and/or 7-symbol. The length of each level of sTTI may be roughly half of the next level sTTI length. Thus, the gap between the end of a sTTI transmission and the corresponding response or feedback subframe may be reduced to two sTTI lengths of the longer length between the UL sTTI and DL sTTI.

Compared with Approach 1, Approach 2 may reduce the association timing latency from 4 sTTI sizes to 3 sTTI sizes, where the sTTI size may be determined based on the larger TTI size between DL and UL. With Approach 2, even if the same sTTI size is used on both DL and UL, the association timing may be further reduced to 3 sTTI for consistency with other cases.

Table 4 provides examples of the association timing following Approach 2. For instance, Table 4 illustrates the association timing for sTTIs with further reduced delay. It should be noted that in Table 4, the timing may be determined based on the larger TTI size between DL and UL. In one case, the DL sTTI size is smaller than the UL sTTI size, and multiple DL sTTIs may be mapped to a single UL sTTI. In another case, the DL sTTI size is larger than the UL sTTI size, and multiple UL sTTIs may be mapped to a single DL sTTI. Furthermore, it is also possible that the sTTI is configured only for DL or only for UL.

TABLE 4

| UL TTI sizes | DL TTI sizes | | |
| --- | --- | --- | --- |
| | 2-symbol | 3/4-symbol | 7-symbol |
| 2-symbol | 6 symbols | 11 symbols | 21 symbols |
| 3/4-symbol | 11 symbols | 11 symbols | 21 symbols |
| 7-symbol | 21 symbols | 21 symbols | 21 symbols |

For the detailed association timing, the same one sTTI-to-multiple sTTI association methods as in Approach 1 may be applied, except that the association timing becomes 3 sTTI instead of 4 sTTI, where the sTTI length may be based on the longer length between the UL sTTI and DL sTTI. This may apply to all association timings including sPDSCH HARQ-ACK feedback timing, sPUSCH scheduling and transmission timing, and HARQ-ACK feedback timing for a sPUSCH transmission.

With Approach 2, the association timing between a transmission sTTI and the response/feedback sTTI may be 3 sTTI lengths, where the sTTI length may be determined by the longer sTTI length between UL sTTI and DL sTTI. The RTT may also be reduced proportionally to 6 sTTI lengths, where the sTTI length may be determined by the longer sTTI length between UL sTTI and DL sTTI. Considering timing advances and processing delay of encoding or decoding, the 3 sTTI length may not be sufficient in some instances (particularly for very short sTTIs, for example). Thus, a more general way to describe the timing may be a (n+k) reference sTTI length association, where k may be smaller or greater than 3 for certain association timings. Accordingly, although some configurations of the systems and methods discussed herein may be described in terms of "n+3" for a reference sTTI length association, the systems and methods may include other implementations where k is utilized instead of 3.

In the association timings discussed above, the sTTI number may be based on the longer sTTI size between DL sTTI and UL sTTI, and sTTI n or sTTI i may be used to represent a reference sTTI. It should be noted that a reference sTTI may include more than 1 sTTI with a shorter size. In another method, a UL sTTI and DL sTTI may also be represented by regular TTI subframe number and an index value within a legacy TTI. Table 5 lists a number of sTTIs included in a legacy subframe or TTI, and the sTTI index range within a legacy TTI. Thus, the k-th sTTI within a legacy subframe i may be represented by the legacy TTI number i and the sTTI index value k.

TABLE 5

| sTTI sizes | Number of sTTIs in a legacy subframe or TTI | sTTI index range within a legacy subframe |
|---|---|---|
| 2-symbol | 7 | 0-6 |
| 3/4-symbol | 4 | 0-3 |
| 7-symbol | 2 | 0-1 |

Figure 16:
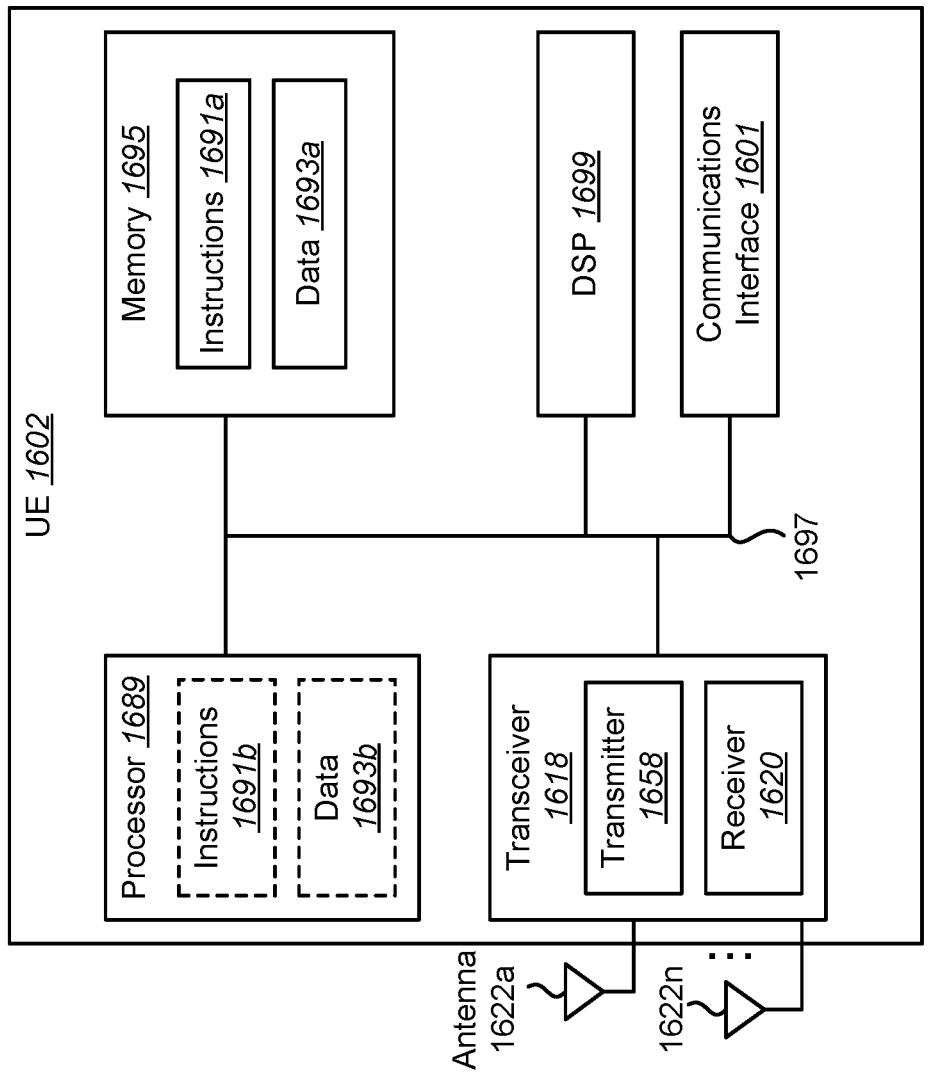
FIG. 16 illustrates various components that may be utilized in a UE.

FIG. 16 illustrates various components that may be utilized in a UE 1602. The UE 1602 described in connection with FIG. 16 may be implemented in accordance with the UE 102 described in connection with FIG. 1. The UE 1602 includes a processor 1689 that controls operation of the UE 1602. The processor 1689 may also be referred to as a central processing unit (CPU). Memory 1695, which may include read-only memory (ROM), random access memory (RAM), a combination of the two or any type of device that may store information, provides instructions 1691a and data 1693a to the processor 1689. A portion of the memory 1695 may also include non-volatile random access memory (NVRAM). Instructions 1691b and data 1693b may also reside in the processor 1689. Instructions 1691b and/or data 1693b loaded into the processor 1689 may also include instructions 1691a and/or data 1693a from memory 1695 that were loaded for execution or processing by the processor 1689. The instructions 1691b may be executed by the processor 1689 to implement one or more of the methods 200, 300 described above.

The UE 1602 may also include a housing that contains one or more transmitters 1658 and one or more receivers 1620 to allow transmission and reception of data. The transmitter(s) 1658 and receiver(s) 1620 may be combined into one or more transceivers 1618. One or more antennas 1622a-n are attached to the housing and electrically coupled to the transceiver 1618.

The various components of the UE 1602 are coupled together by a bus system 1697, which may include a power bus, a control signal bus and a status signal bus, in addition to a data bus. However, for the sake of clarity, the various buses are illustrated in FIG. 16 as the bus system 1697. The UE 1602 may also include a digital signal processor (DSP) 1699 for use in processing signals. The UE 1602 may also include a communications interface 1601 that provides user access to the functions of the UE 1602. The UE 1602 illustrated in FIG. 16 is a functional block diagram rather than a listing of specific components.

Figure 17:
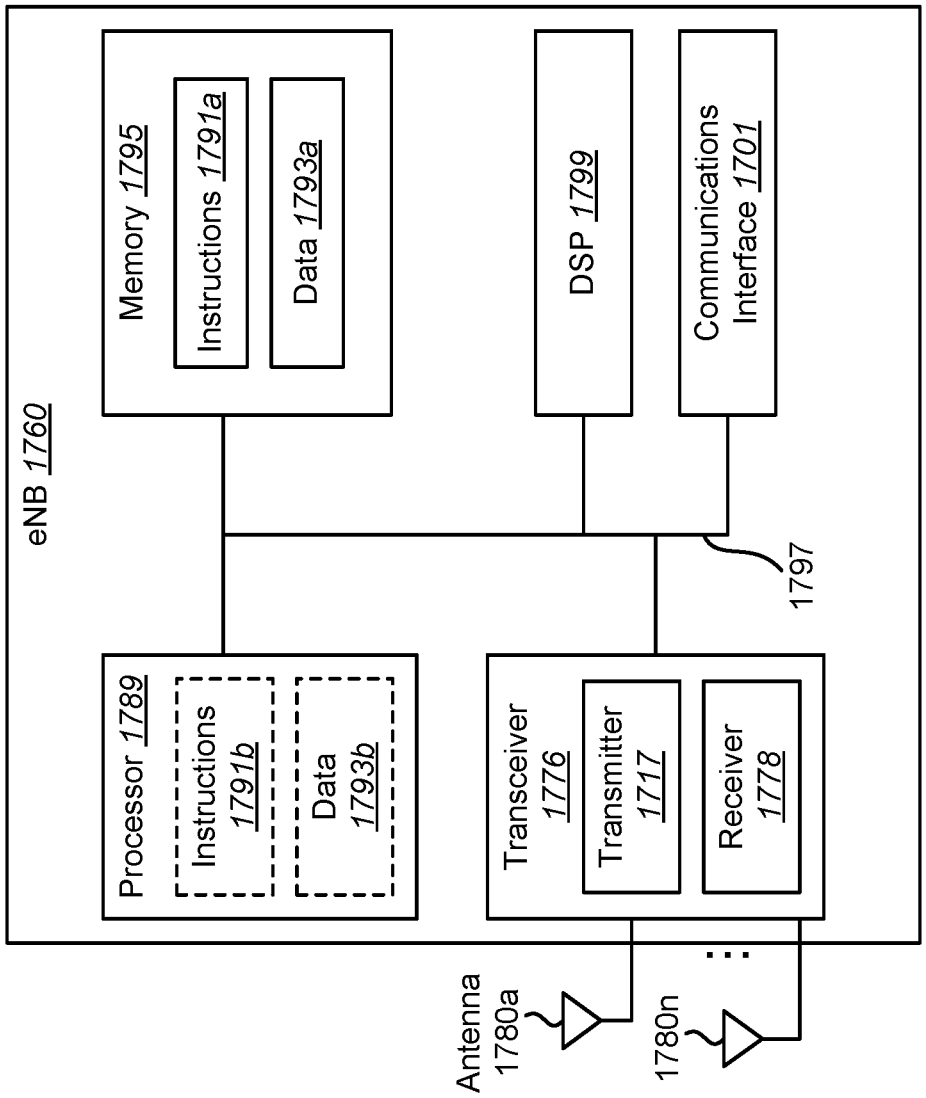
FIG. 17 illustrates various components that may be utilized in an eNB.

FIG. 17 illustrates various components that may be utilized in an eNB 1760. The eNB 1760 described in connection with FIG. 17 may be implemented in accordance with the eNB 160 described in connection with FIG. 1. The eNB 1760 includes a processor 1789 that controls operation of the eNB 1760. The processor 1789 may also be referred to as a central processing unit (CPU). Memory 1795, which may include read-only memory (ROM), random access memory (RAM), a combination of the two or any type of device that may store information, provides instructions 1791a and data 1793a to the processor 1789. A portion of the memory 1795 may also include non-volatile random access memory (NVRAM). Instructions 1791b and data 1793b may also reside in the processor 1789. Instructions 1791b and/or data 1793b loaded into the processor 1789 may also include instructions 1791a and/or data 1793a from memory 1795 that were loaded for execution or processing by the processor 1789. The instructions 1791b may be executed by the processor 1789 to implement one or more of the methods 200, 400 described above.

The eNB 1760 may also include a housing that contains one or more transmitters 1717 and one or more receivers 1778 to allow transmission and reception of data. The transmitter(s) 1717 and receiver(s) 1778 may be combined into one or more transceivers 1776. One or more antennas 1780a-n are attached to the housing and electrically coupled to the transceiver 1776.

The various components of the eNB 1760 are coupled together by a bus system 1797, which may include a power bus, a control signal bus and a status signal bus, in addition to a data bus. However, for the sake of clarity, the various buses are illustrated in FIG. 17 as the bus system 1797. The eNB 1760 may also include a digital signal processor (DSP) 1799 for use in processing signals. The eNB 1760 may also include a communications interface 1701 that provides user access to the functions of the eNB 1760. The eNB 1760 illustrated in FIG. 17 is a functional block diagram rather than a listing of specific components.

Figure 18:
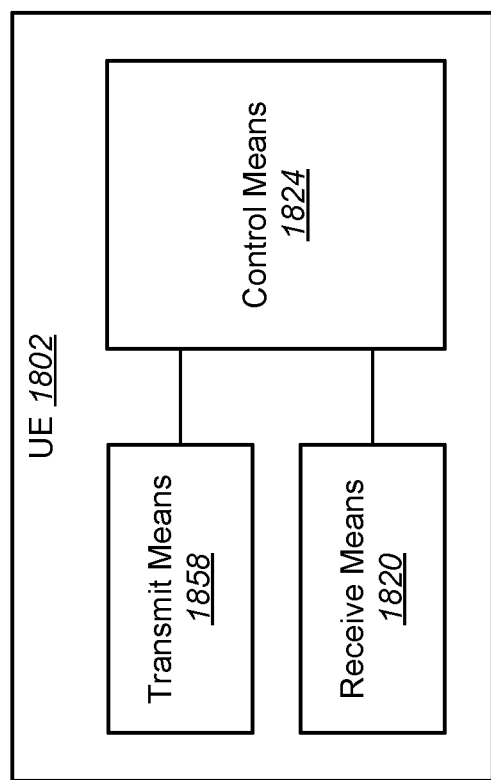
FIG. 18 is a block diagram illustrating one implementation of a UE in which systems and methods for FDD TTI operation may be implemented.

FIG. 18 is a block diagram illustrating one implementation of a UE 1802 in which systems and methods for FDD TTI operation may be implemented. The UE 1802 includes transmit means 1858, receive means 1820 and control means 1824. The transmit means 1858, receive means 1820 and control means 1824 may be configured to perform one or more of the functions described in connection with one or more of FIGS. 1-3 above. FIG. 16 above illustrates one example of a concrete apparatus structure of FIG. 18. Other various structures may be implemented to realize one or more of the functions of FIG. 1. For example, a DSP may be realized by software.

Figure 19:
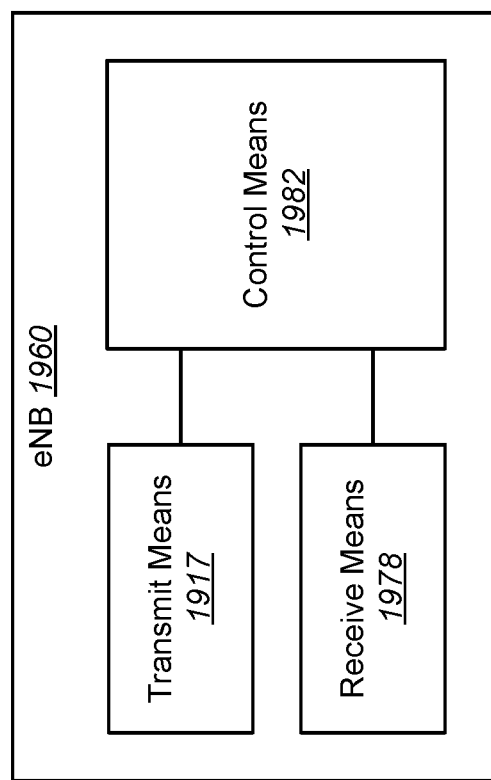
FIG. 19 is a block diagram illustrating one implementation of an eNB in which systems and methods for FDD TTI operation may be implemented.

FIG. 19 is a block diagram illustrating one implementation of an eNB 1960 in which systems and methods for FDD TTI operation may be implemented. The eNB 1960 includes transmit means 1917, receive means 1978 and control means 1982. The transmit means 1917, receive means 1978 and control means 1982 may be configured to perform one or more of the functions described in connection with one or more of FIGS. 1-2 and 4 above. FIG. 17 above illustrates one example of a concrete apparatus structure of FIG. 19. Other various structures may be implemented to realize one or more of the functions of FIG. 1. For example, a DSP may be realized by software.

The term "computer-readable medium" refers to any available medium that may be accessed by a computer or a processor. The term "computer-readable medium," as used herein, may denote a computer- and/or processor-readable medium that is non-transitory and tangible. By way of example, and not limitation, a computer-readable or processor-readable medium may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer or processor. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

It should be noted that one or more of the methods described herein may be implemented in and/or performed using hardware. For example, one or more of the methods described herein may be implemented in and/or realized using a chipset, an application-specific integrated circuit (ASIC), a large-scale integrated circuit (LSI) or integrated circuit, etc.

Each of the methods disclosed herein comprises one or more steps or actions for achieving the described method. The method steps and/or actions may be interchanged with one another and/or combined into a single step without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the systems, methods, and apparatus described herein without departing from the scope of the claims.

A program running on the eNB 160 or the UE 102 according to the described systems and methods is a program (a program for causing a computer to operate) that controls a CPU and the like in such a manner as to realize the function according to the described systems and methods. Then, the information that is handled in these apparatuses is temporarily stored in a RAM while being processed. Thereafter, the information is stored in various ROMs or HDDs, and whenever necessary, is read by the CPU to be modified or written. As a recording medium on which the program is stored, among a semiconductor (for example, a ROM, a nonvolatile memory card, and the like), an optical storage medium (for example, a DVD, a MO, a MD, a CD, a BD, and the like), a magnetic storage medium (for example, a magnetic tape, a flexible disk, and the like), and the like, any one may be possible. Furthermore, in some cases, the function according to the described systems and methods described above is realized by running the loaded program, and in addition, the function according to the described systems and methods is realized in conjunction with an operating system or other application programs, based on an instruction from the program.

Furthermore, in a case where the programs are available on the market, the program stored on a portable recording medium may be distributed or the program may be transmitted to a server computer that connects through a network such as the Internet. In this case, a storage device in the server computer also is included. Furthermore, some or all of the eNB 160 and the UE 102 according to the systems and methods described above may be realized as an LSI that is a typical integrated circuit. Each functional block of the eNB 160 and the UE 102 may be individually built into a chip, and some or all functional blocks may be integrated into a chip. Furthermore, a technique of the integrated circuit is not limited to the LSI, and an integrated circuit for the functional block may be realized with a dedicated circuit or a general-purpose processor. Furthermore, if with advances in a semiconductor technology, a technology of an integrated circuit that substitutes for the LSI appears, it is also possible to use an integrated circuit to which the technology applies.

Moreover, each functional block or various features of the base station device and the terminal device used in each of the aforementioned embodiments may be implemented or executed by a circuitry, which is typically an integrated circuit or a plurality of integrated circuits. The circuitry designed to execute the functions described in the present specification may comprise a general-purpose processor, a digital signal processor (DSP), an application specific or general application integrated circuit (ASIC), a field programmable gate array (FPGA), or other programmable logic devices, discrete gates or transistor logic, or a discrete hardware component, or a combination thereof. The general-purpose processor may be a microprocessor, or alternatively, the processor may be a conventional processor, a controller, a microcontroller or a state machine. The general-purpose processor or each circuit described above may be configured by a digital circuit or may be configured by an analogue circuit. Further, when a technology of making into an integrated circuit superseding integrated circuits at the present time appears due to advancement of a semiconductor technology, the integrated circuit by this technology is also able to be used.

What is claimed is:

1. A user equipment, comprising:
a processor; and
memory in electronic communication with the processor, wherein instructions stored in the memory are executable to:
obtain configuration of downlink (DL) shortened transmission time intervals (sTTIs) and uplink (UL) sTTIs, each of the DL sTTIs being shorter than any of the UL sTTIs; and
report, in a single UL sTTI of the UL sTTIs, Hybrid Automatic Repeat Request Acknowledgement/Negative Acknowledgement (HARQ-ACK) for each shortened Physical Downlink Shared CHannel (sPDSCH) in a set of two or more of the DL sTTIs; wherein
the set of two or more of the DL sTTIs is mapped to the single UL sTTI, at least one DL sTTI of the set of two or more of the DL sTTIs has a length different from that of one or more remaining DL sTTIs of the set of two or more of the DL sTTIs, a sum total of lengths of the two or more of the DL sTTIs in the set of two or more of the DL sTTIs is 7 symbols, and a length of the single UL sTTI is 7 symbols.

2. A base station, comprising:
a processor; and
memory in electronic communication with the processor, wherein instructions stored in the memory are executable to:
send configuration of downlink (DL) shortened transmission time intervals (sTTIs) and uplink (UL) sTTIs, each of the DL sTTIs being shorter than any of the UL sTTIs; and
receive, in a single UL sTTI of the UL sTTIs, Hybrid Automatic Repeat Request Acknowledgement/Negative Acknowledgement (HARQ-ACK) for each shortened Physical Downlink Shared CHannel (sPDSCH) in a set of two or more of the DL sTTIs; wherein
the set of two or more of the DL sTTIs is mapped to the single UL sTTI, at least one DL sTTI of the set of two or more of the DL sTTIs has a length different from that of one or more remaining DL sTTIs of the set of two or more of the DL sTTIs, a sum total of lengths of the two or more of the DL sTTIs in the set of two or more of the DL sTTIs is 7 symbols, and a length of the single UL sTTI is 7 symbols.

3. A method of a terminal device, the method comprising:
obtaining configuration of downlink (DL) shortened transmission time intervals (sTTIs) and uplink (UL) sTTIs, each of the DL sTTIs being shorter than any of the UL sTTIs; and
reporting, in a single UL sTTI of the UL sTTIs, Hybrid Automatic Repeat Request Acknowledgement/Negative Acknowledgement (HARQ-ACK) for each shortened Physical Downlink Shared CHannel (sPDSCH) in a set of two or more of the DL sTTIs; wherein the set of two or more of the DL sTTIs is mapped to the single UL sTTI, at least one DL sTTI of the set of two or more of the DL sTTIs has a length different from that of one or more remaining DL sTTIs of the set of two or more of the DL sTTIs, a sum total of lengths of the two or more of the DL sTTIs in the set of two or more of the DL sTTIs is 7 symbols, and a length of the single UL sTTI is 7 symbols.

4. A method of a base station, the method comprising:

sending configuration of downlink (DL) shortened transmission time intervals (sTTIs) and uplink (UL) sTTIs, each of the DL sTTIs being shorter than any of the UL sTTIs; and receiving, in a single UL sTTI of the UL sTTIs, Hybrid Automatic Repeat Request Acknowledgement/Negative Acknowledgement (HARQ-ACK) for each shortened Physical Downlink Shared CHannel (sPDSCH) in a set of two or more of the DL sTTIs; wherein the set of two or more of the DL sTTIs is mapped to the single UL sTTI, at least one DL sTTI of the set of two or more of the DL sTTIs has a length different from that of one or more remaining DL sTTIs of the set of two or more of the DL sTTIs, a sum total of lengths of the two or more of the DL sTTIs in the set of two or more of the DL sTTIs is 7 symbols, and a length of the single UL sTTI is 7 symbols.

* * * * *